US011904978B1

(12) United States Patent
Apte

(10) Patent No.: US 11,904,978 B1
(45) Date of Patent: Feb. 20, 2024

(54) HYBRIDIZED MOUNTAIN BIKE SUSPENSION

(71) Applicant: Rajas Apte, Saratoga, CA (US)

(72) Inventor: Rajas Apte, Saratoga, CA (US)

(73) Assignee: MANOJ APTE, Saratoga, CA (US)

( * ) Notice: Subject to any disclaimer, the term of this patent is extended or adjusted under 35 U.S.C. 154(b) by 0 days.

(21) Appl. No.: 18/243,553

(22) Filed: Sep. 7, 2023

(51) Int. Cl.
*B62K 25/08* (2006.01)
*B62J 45/41* (2020.01)
*B62J 45/20* (2020.01)
*B62J 45/421* (2020.01)
*B62J 45/422* (2020.01)
*B62J 45/42* (2020.01)
*B62K 25/04* (2006.01)

(52) U.S. Cl.
CPC ............... *B62K 25/08* (2013.01); *B62J 45/20* (2020.02); *B62J 45/41* (2020.02); *B62J 45/42* (2020.02); *B62J 45/421* (2020.02); *B62J 45/422* (2020.02); *B62K 2025/044* (2013.01)

(58) Field of Classification Search
CPC .... B62K 25/08; B62K 2025/044; B62J 45/20; B62J 45/41; B62J 45/421; B62J 45/42; B62J 45/422
See application file for complete search history.

(56) References Cited

U.S. PATENT DOCUMENTS

| 11,760,150 | B2* | 9/2023 | Marking | F16F 9/466 188/266.2 |
| 2011/0202236 | A1* | 8/2011 | Galasso | B62K 25/286 701/37 |
| 2013/0144489 | A1* | 6/2013 | Galasso | B60G 17/0424 701/37 |
| 2014/0316652 | A1* | 10/2014 | Ericksen | F16F 9/512 701/37 |
| 2018/0339566 | A1* | 11/2018 | Ericksen | B60G 17/08 |
| 2019/0092116 | A1* | 3/2019 | Magnus | B62K 25/08 |
| 2019/0232968 | A1* | 8/2019 | Reynolds | A61B 5/1071 |
| 2019/0270358 | A1* | 9/2019 | Korrect | B60G 17/018 |
| 2019/0346004 | A1* | 11/2019 | Higgins | B62J 45/42 |
| 2021/0387690 | A1* | 12/2021 | Allinger | B62J 45/416 |
| 2022/0266939 | A1* | 8/2022 | Ericksen | B62J 45/412 |
| 2023/0331333 | A1* | 10/2023 | Ericksen | A61F 2/70 |
| 2023/0348007 | A1* | 11/2023 | Krugman | F16F 9/0209 |

FOREIGN PATENT DOCUMENTS

WO WO-2019063670 A1 * 4/2019 ......... B60G 17/0155

* cited by examiner

*Primary Examiner* — Toan C To
(74) *Attorney, Agent, or Firm* — SCHWEGMAN LUNDBERG & WOESSNER, P.A.

(57) ABSTRACT

A system provides suspension for a mountain bike. The system includes at least a shock and a data collection system. A set of wave characteristics are determined based on data collected by the data collection system. A first change in the wave characteristics is detected, the first change being greater than a threshold indicating an obstacle. Responsive to determining the first change is greater than the threshold, the system enables the shock to compress. A second change in the wave characteristics is detected, the second change being less than the threshold indicating an obstacle. Responsive to determining the second change is less than the threshold, the system causes destructive interference in the shock to inhibit compression of the shock.

20 Claims, 12 Drawing Sheets

HYBRIDIZED MOUNTAIN BIKE SUSPENSION

BACKGROUND

A mountain bicycle ("bike") is a bicycle intended for off-road use on difficult terrain. Conventionally mountain bikes have a suspension system for the front wheel and/or the rear wheel, termed "fork" and "shock," respectively. The suspension improves efficiency of mountain biking over obstacles commonly encountered on the trail, such as rocks, roots, and ruts. These obstacles can vary in size from a couple inches in height to four feet or more. Upon encountering an upward force on a wheel, such as from an obstacle, the suspension will compress. The amount of compression can vary from around eighty millimeters of travel to around two-hundred millimeters of travel, depending on the suspension. Some of the intended purposes of the suspension are to create a smoother ride, allow the rider to pedal while on harsh terrain, and allow the rider to retain speed on rough terrain.

A conventional mountain bike suspension is a mechanical spring and damper system, with no electronic components. These suspensions are considered to be "passive," meaning adjusting the suspension requires a person physically changing the settings. Passive suspensions cannot automatically adjust in real time in order to suit the terrain, riding style, or rider position. The inability to adjust in real time has consequences on race courses, where a rider may need to pedal in one section, necessitating a stiff suspension setup, but then need to shift to absorb large compressions from obstacles in another section, which would necessitate a softer suspension setup, sometimes within milliseconds.

Passive suspensions sometimes have a lockout feature that stiffens the suspension, which is generally used on climbs in cross country racing. However, climbing sections are becoming progressively more technical on contemporary mountain bike racing courses. Since the lockout nullifies any advantage a suspension gives the rider in terms of shock absorption, the lockout typically cannot be used on these increasingly technical climbing sections.

Recently, there has been a rise in "semi-active" suspensions, capable of adjusting the overall compression settings automatically. Some of the most notable semi-active suspensions are Live Valve™ from Fox Racing Shox™, Flight Attendant from Rockshox™, Brain from Specialized™ and Rockshox™, and a recent prototype suspension system developed by Fox Racing Shox™ as yet referred to as RAD. All three are able to detect certain riding conditions and set the suspension in one of multiple preset modes, which in racing is typically preferable to a rider needing to manually adjust settings. However, these semi-active suspensions cannot adjust in real time to the actual terrain, making adjustments once every few minutes at most. Some have other drawbacks such as heaviness, bulkiness, and/or short lifetimes of use.

Conventional suspensions will frequently compress due to the pedaling forces imparted by the rider. This unintended compression of the suspension is detrimental to pedaling efficiency because the suspension absorbs some of the rider's power, resulting in less forward speed. This issue is significant in mountain bike racing, particularly in the racing disciplines of cross-country and enduro, since the races involve rough downhill sections as well as steady climbing sections, meaning that the suspension has to actuate on both the uphill and downhill sections. Existing technologies, including semi-active suspensions, do not take into account the force from pedaling exerted by the rider. There is a demand for a suspension that inhibits unintentional compression.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
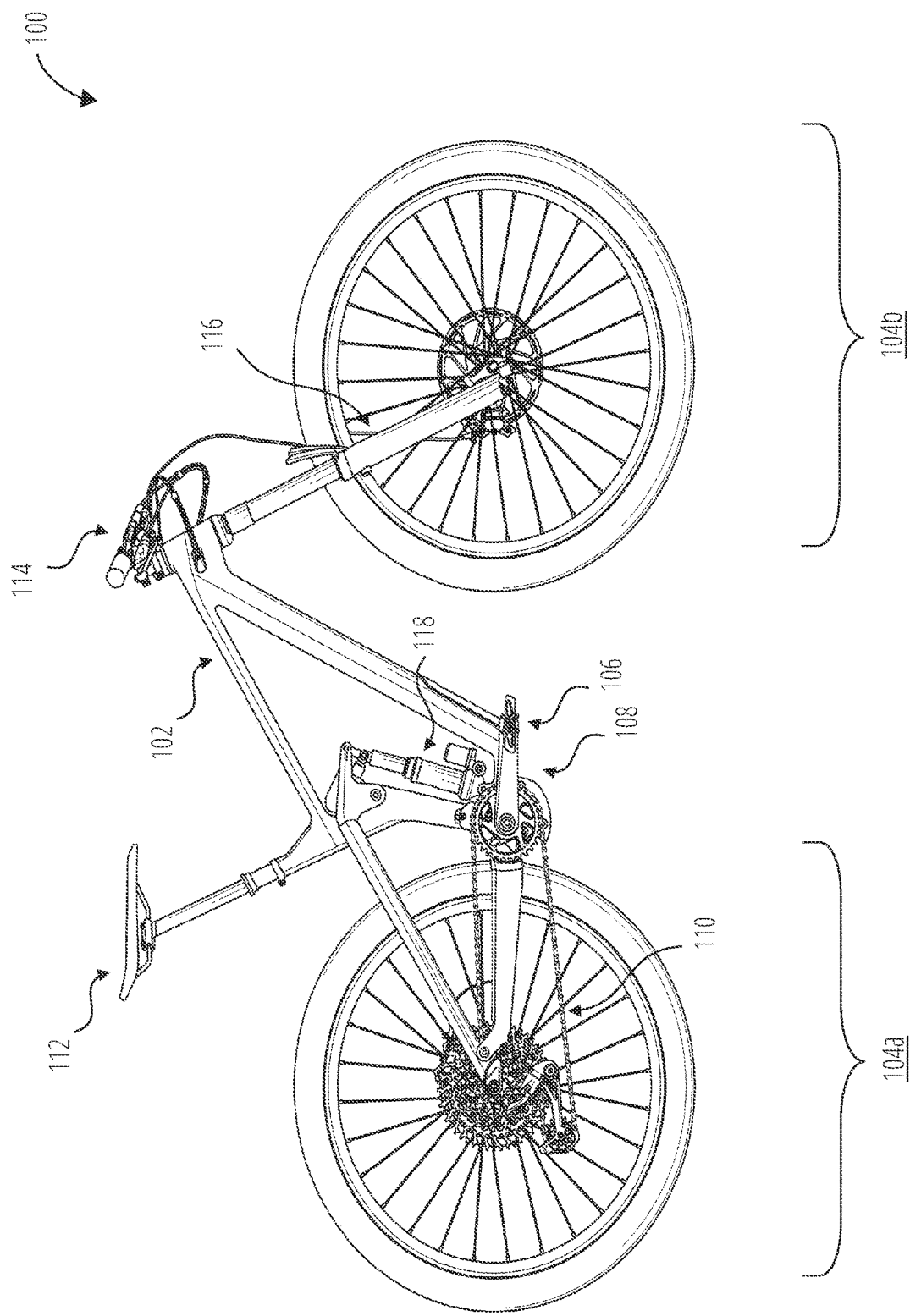
FIG. 1A illustrates an exemplary mountain bike, in accordance with some examples.

Systems, methods, and apparatuses presented herein provide a means for a mountain bike suspension system that provides improved shock absorption by differentiating between forces imparted by a rider and forces imparted by obstacles. To maximize efficiency while racing, a suspension must be able to oppose and not compress due to pedaling forces from the rider, while still compressing due to forces imparted by obstacles on the trail (e.g., rocks, roots, ruts). The bike system includes a data collection system that collects data from one or more sensors of one or more types placed throughout the mountain bike. The bike system differentiates between the rider's pedaling forces and obstacles using the collected data.

As the bike moves, the suspension moves. The movement of the suspension can be represented as a wave, called a suspension oscillation wave herein. The movement of the suspension is impacted by the rider's pedaling forces, forces imparted by obstacles, and other forces on the bike. The collected data correlates to movement of and forces on the bike. The suspension oscillation wave is generated based on the data collected. A variation in the suspension oscillation wave (or in the data collected) that exceeds a threshold indicating an obstacle triggers the bike system to soften the suspension in response. A variation that does not exceed any respective thresholds indicates a change in rider forces, and in response the bike system stiffens or otherwise remains stiff.

The data collection system includes a number of sensors, such as: a displacement measurement apparatus, one or more chain sensors, one or more shim sensors, one or more pedal sensors, one or more crank position sensors, one or more handlebar sensors, one or more frame sensors, one or more temperature sensors, or any combination thereof. The data collection system collects data which are stored and processed by one or more electronic components of the bike system.

The bike system includes a suspension comprising a shock and/or a fork on the mountain bike, each configured to compress under force. The bike system further includes a processor and a non-transitory computer readable medium having instructions thereon which can be executed by the processor. According to some embodiments, the processor is configured to control the compression and release of the shock and/or fork or internal components thereof.

In response to a change in the suspension oscillation wave, the bike system determines whether the cause is a change in the rider's pedaling or an obstacle, according to some examples. The bike system generates destructive interference within the suspension in response to the rider's pedaling, according to some examples. The destructive interference opposes movement of the suspension or otherwise stiffens the suspension. As a result, more of the rider's power is translated into forward motion of the mountain bike. The bike system generates constructive interference within the suspension in response to obstacles. The constructive interference facilitates movement of the suspension, making the suspension less stiff. As a result, the suspension provides better shock absorption of the obstacle.

FIG. 1A illustrates an exemplary mountain bike 100, in accordance with some embodiments. The mountain bike 100 includes at least a frame 102 and two wheels 104: a 104a and a front wheel 104b. The frame 102 is typically composed of a stiff but lightweight material, such as aluminum or a composite. The wheels 104 of the mountain bike 100 each have an inflatable rubber tube over top of a stiff frame supported by spokes. The air pressure in the inflatable rubber tubes is typically adjustable. Mountain bike 100 frames 102 are typically thicker than other types of bicycles and feature large treads. The frame 102 of the mountain bike 100 is connected to the 104a by a rear tire axle.

The mountain bike 100 includes two pedals 106, each pedal 106 connected to the other by a crank 108. Applying force to one pedal 106 turns the crank 108, and turning the crank 108 moves the chain 110. The chain 110 connects to a number of gears on the 104a. Moving the chain 110 rotates the gears, thereby rotating the 104a.

The mountain bike 100 includes a seat 112, which typically has an adjuster to adjust the height of the seat. The seat 112 connects to the frame 102 at the adjuster. The mountain bike 100 also includes a handlebar 114 that attaches to the frame 102 on or near a steering tube that enables rotation and steering of the front wheel 104b. The handlebar 114 typically features bilateral hand grips for a rider to grip, one or more breaks for stopping the mountain bike 100, and one or more gear shifts to switch between from one gear to another of the number of gears on the 104a. A contemporary handlebar 114 may additionally or alternatively feature one or more electronic components.

Some mountain bikes 100 include a shock 118 and/or a fork 116. The shock 118 and fork 116 are each physical suspension components that are compressible spring-damper systems. The shock 118, sometimes referred to as a "rear shock" or a "rear suspension," is located towards the rear of the mountain bike 100. The upper end of the shock 118 connects to an upper portion of the frame 102 and the lower end of the shock connects to a lower portion of the frame 102. The fork 116 connects to the frame 102 through the steerer tube on one end, and connects to the front wheel 104b through a front wheel axle. The fork 116 is discussed further in FIG. 1B and the shock 118 is discussed further in FIG. 1C.

When mounting the mountain bike, a rider sits in the seat 112 and places one or both hands on the handlebar 114 for steering and balance support. The rider places one foot on each pedal 106. Applying a downward force to one pedal 106 begins turning the 104a, and the front wheel 104b moves in conjunction, beginning riding. When riding, if the rider encounters an obstacle with the front wheel 104b, such as a large tree root, the fork 116 may compress to soften the force of hitting the obstacle. Similarly, if the rider encounters an obstacle with the 104a, such as a rut in the trail, the shock 118 may compress to soften the force of hitting the obstacle.

Figure 1B:
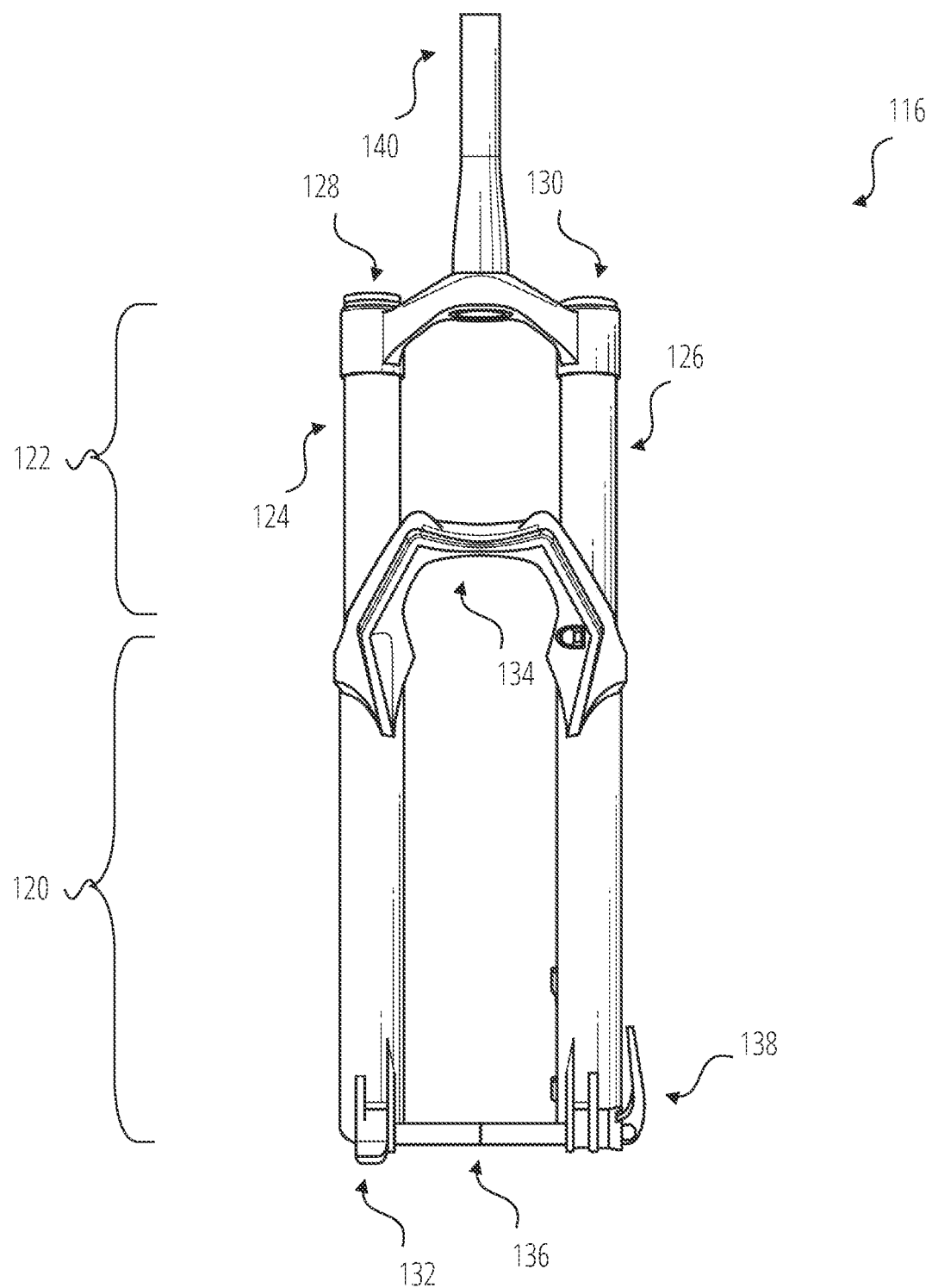
FIG. 1B illustrates an exemplary fork, in accordance with some examples.

FIG. 1B illustrates an exemplary fork 116, in accordance with some examples. The fork 116 is a suspension component containing one or more spring-damper systems located towards the front of the bike. A fork 116 is sometimes referred to as a "telescoping fork," a "telescopic fork" or a "front suspension."

The fork 116 includes a set of two stanchions 122 and a set of two legs 120. Each stanchion 122 is at least partially inserted into a leg 120, according to some examples. The stanchions 122 are configured to slide in and out of the legs 120, according to some examples. When compressive force is applied to the fork 116, each stanchion 122 is displaced further into the respective leg 120 such that the vertical height of the fork 116 decreases. When compressive force is released, each stanchion 122 rebounds partially or fully from its compressed displacement in the leg 120 such that the vertical height of the fork 116 increases.

The fork 116 is a spring-damper system, containing both a damper chamber 124 and a spring chamber 126. Each of the damper chamber 124 and the spring chamber 126 are housed within a stanchion 122 and/or a leg 120, typically each on one side of the fork 116. According to some embodiments, the damper chamber 124 and the spring chamber 126 are oriented on their respective sides as illustrated in FIG. 1B. In other embodiments, the damper chamber 124 and the spring chamber 126 may be oriented on opposite sides from that illustrated in FIG. 1B. The orientation of the damper chamber 124 and the spring chamber 126 has little to no impact on functionality of the fork 116.

The damper chamber 124 houses a damper (sometimes called a "shock absorber" or "dashpot") and the spring chamber 126 houses a spring. The spring in the spring chamber 126 may be either an air spring or a coil spring. According to some exemplary embodiments, the spring in the spring chamber 126 is an air spring. The damper in the damper chamber 124 may be a mechanical damper, a hydraulic damper, a pneumatic damper, a damper with electronic or electromagnetic components, any combination thereof, or another type of damper. According to some exemplary embodiments, the damper in the damper chamber 124 is a linear hydraulic damper that includes a piston.

The fork 116 optionally includes a compression adjustment apparatus 128 adjacent to the damper chamber 124 and an air pressure adjustment apparatus 130 adjacent to the spring chamber 126. The fork 116 also optionally includes a rebound adjustment apparatus 132, located at toward the bottom of a leg 120 of the fork 116. The compression adjustment apparatus 128, the rebound adjustment apparatus 132, and the air pressure adjustment apparatus 130 each may be adjustable through any type of adjustment apparatus, such as a valve, a knob, a lever, a dial, a switch, a key, an electronic component or electronic version of any thereof (e.g., a remote control), or any combination thereof.

The compression adjustment apparatus 128 is used to increase or decrease the damper constant of the damper in the damper chamber 124. The compression adjustment apparatus 128 can also be used to enable a "lockout," as discussed previously. Typically, compression adjustment apparatus 146 are blue in order to be readily recognizable to riders.

The air pressure adjustment apparatus 130 is included in embodiments wherein the fork 116 is an air suspension (i.e., the spring is an air spring). The air pressure adjustment apparatus 130 is used to increase or decrease the spring constant of the air spring by increasing or decreasing the air pressure in the spring chamber 126.

The rebound adjustment apparatus 132 is used to increase or decrease the speed at which the stanchions 122 return from a displaced position. That is, the rebound adjustment apparatus 132 controls how quickly the fork 116 recovers to an uncompressed state. Typically, the rebound adjustment apparatus 132 is red in order to be readily recognizable to riders.

An arch 134 bridges the stanchion 122 of the damper chamber 124 side of the fork 116 to the stanchion 122 of the spring chamber 126 side. The arch 134 is curved for better structural integrity as well as to give space for the front wheel 104b underneath the arch 134. Optionally, a mudflap may be mounted to the arch 134 to protect the rider from mud and debris.

The distal end of each of the legs 120 attaches to a front wheel axle 136 for the front wheel 104b. When installed on a mountain bike 100, the front wheel axle 136 is threaded through the front wheel 104b. The fork 116 optionally includes a dropout 138 which facilitate removing the front wheel 104b from the front wheel axle 136. The dropout 138 may, for example, be an open U-shaped groove at the bottom of each leg 120. Additionally or alternatively, the fork 116 may have a quick release on the front wheel axle 136 to enable quick front wheel 104b removal.

The proximal end of the fork 116 is a steerer tube 140, which may also be known as a "steering tube" or a "steering column." The steerer tube 140 is rigid and connects the fork 116 to the frame 102 and handlebars 114 of the mountain bike 100. When the handlebars 114 are rotated, the steerer tube 140 rotates with them. The steerer tube 140 rotates the fork 116, including the front wheel 104b on the front wheel axle 136, thereby steering the mountain bike 100.

A fork 116 may have additional or alternative components to those illustrated and described in FIG. 1B. For example, forks 116 designed for a specific type of mountain bike racing may include features specific to the type of racing (e.g., enduro). Further, a fork 116 may have a different configuration and/or orientation of components described herein. For example, some forks 116 have an inverted orientation of the legs 120 and the stanchions 122. That is, the legs 120 are oriented on top of the stanchions 122, and the stanchions 122 are displaced upward into the legs 120 when under compressive force. Additionally, some forks 116 have only one leg 120 and the damper chamber 124 and spring chamber 126 are both housed inside the single leg 120.

Figure 1C:
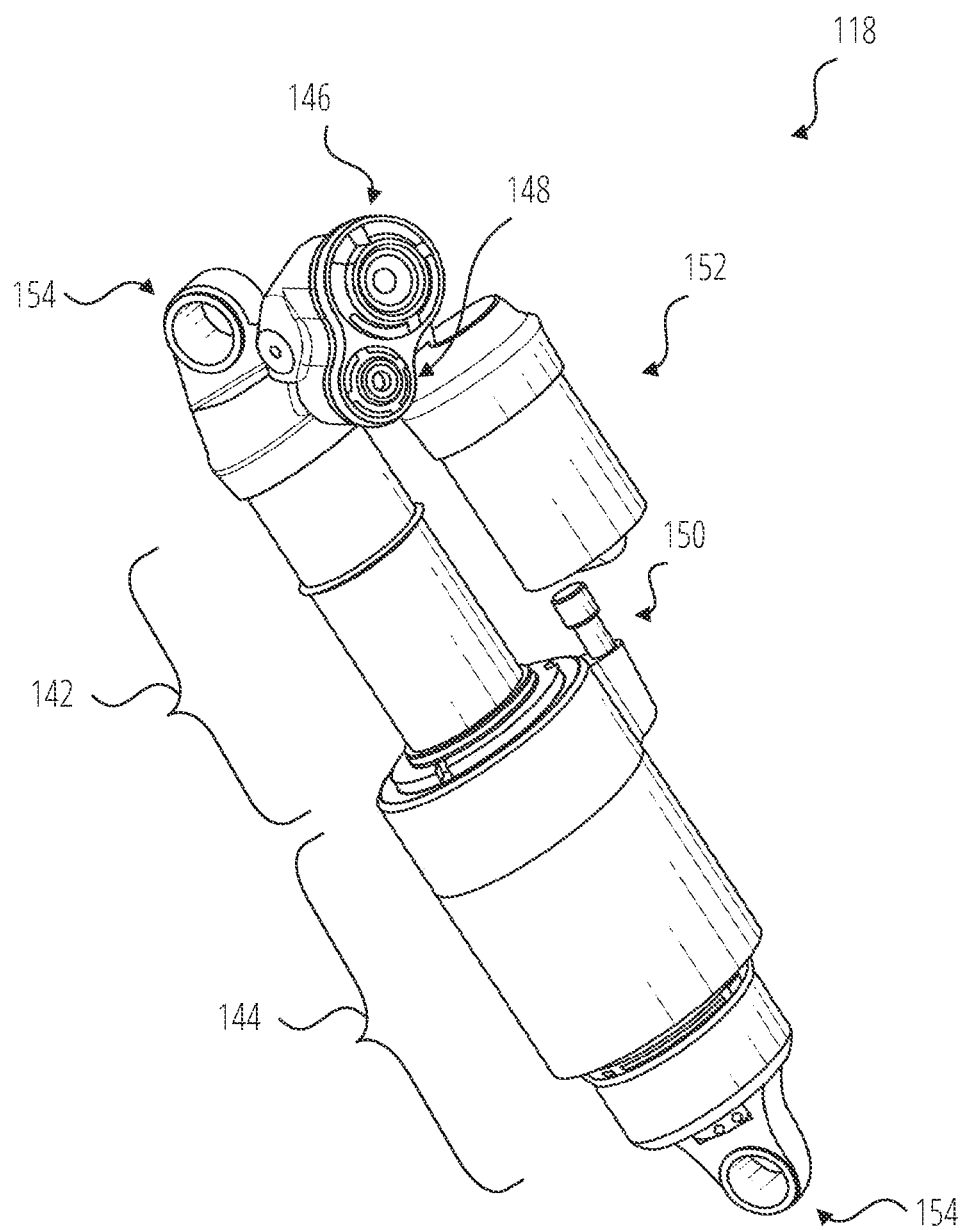
FIG. 1C illustrates an exemplary shock, in accordance with some examples.

FIG. 1C illustrates an exemplary shock 118, in accordance with some examples. The shock 118 is suspension component containing one or more spring-damper systems. The spring of the spring-damper system of the shock 118 may be any type of spring previously discussed in relation to the fork 116. Likewise, the damper of the spring-damper system of the shock 118 may be any type of damper previously discussed in relation to the fork 116.

The spring-damper system of the shock 118 is typically housed within a stanchion 142 and/or a main body 144 of the shock 118. The stanchion 142 is at least partially inserted into the main body 144. The stanchion 142 is configured to slide in and out of the main body 144. When compressive force is applied to the shock 118, the stanchion 142 is displaced further into the main body 144 such that the vertical height of the shock 118 decreases. When compressive force is released, the stanchion 142 rebounds partially or fully from its compressed displacement in the main body 144 such that the vertical height of the shock 118 increases.

Typically the shock 118 includes a compression adjustment apparatus 146, a rebound adjustment apparatus 148, and an air pressure adjustment apparatus 150, each located somewhere on the exterior of the shock 118. The compression adjustment apparatus 146, the rebound adjustment apparatus 148, and the air pressure adjustment apparatus 150 each may be adjustable through any type of adjustment apparatus described previously in relation to the compression adjustment apparatus 128 and the air pressure adjustment apparatus 130 of the fork 116 of FIG. 1B. The precise location of each adjustment apparatus may vary on different shocks 118.

The compression adjustment apparatus 146 is used to increase or decrease the damper constant of the damper in the shock 118. The compression adjustment apparatus 128 can also be used to enable a "lockout," as discussed previously. Typically, compression adjustment apparatus 146 are blue in order to be readily recognizable to riders.

The rebound adjustment apparatus 148 is used to increase or decrease the speed at which the stanchion 142 returns from a displaced position. That is, the rebound adjustment apparatus 148 controls how quickly the shock 118 recovers to an uncompressed state. Typically, rebound adjustment apparatus 148 are red in order to be readily recognizable to riders.

The air pressure adjustment apparatus 150 is included in embodiments wherein the shock 118 is an air suspension. The air pressure adjustment apparatus 150 is used to increase or decrease the spring constant of the air spring by increasing or decreasing the air pressure in the air spring.

The shock 118 optionally includes a piggyback reservoir 152. The piggyback reservoir 152 contains an additional spring-damper system to enable more consistent damping. The piggyback reservoir 152 is often included in shocks 118 that are configured for a large amount of displacement (i.e., large travel).

The shock 118 typically includes one or more eyelets 154 through which the shock 118 connects to the frame 102. Each eyelet 154 may contain a number of hardware for attachment to the frame 102, such as bushings, bearings, nuts, and the like.

A shock 118 may have additional or alternative components to those illustrated and described in FIG. 1C. For example, while the shock 118 depicted is an air suspension with an air spring, according to some examples the shock 118 is a coil suspension and may have a coil spring wrapped around the exterior of the stanchion 142 and main body 144, connecting at the proximal end of the stanchion 142 and the distal end of the main body 144. Further, a shock 118 may have a different configuration and/or orientation of components described herein. For example, the air pressure adjustment apparatus 150 may be located on a different part of the shock 118.

Figure 2:
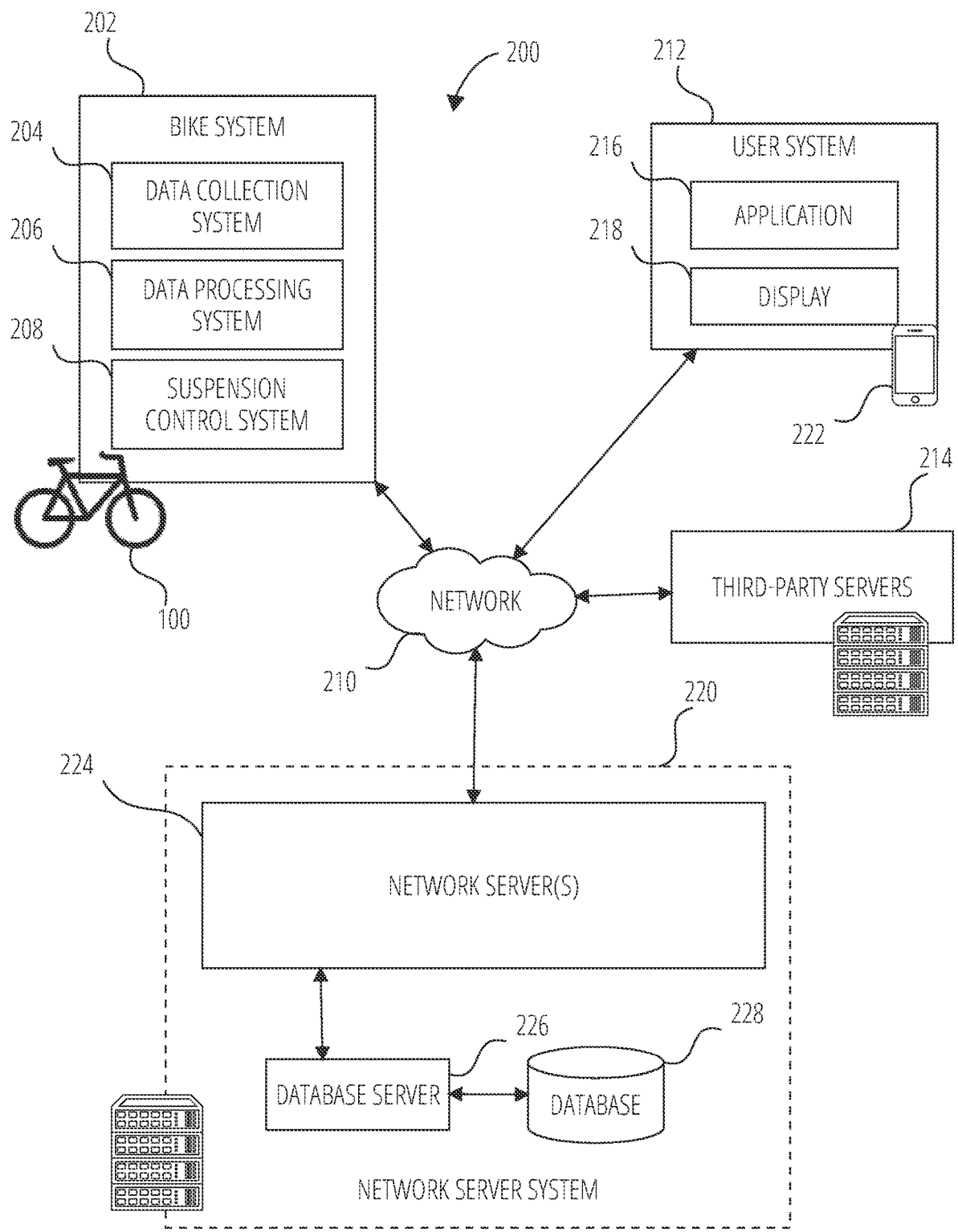
FIG. 2 is a diagrammatic representation of an example system for exchanging data, according to some examples.

FIG. 2 is a block diagram showing an example system 200 for exchanging data, according to some examples. The system 200 includes at least one bike system 202, each of which collects and processes data about an associated mountain bike 100. The bike system 202 includes a data collection system 204, a data processing system 206, and a suspension control system 208. Each bike system 202 can be communicatively coupled, via a network 210, to one or more user systems 212, one or more third-party servers 214, and one or more network server systems 220.

The mountain bike 100 is a physical vehicle with two wheels ridden by a rider. While riding, the data collection system 204 collects input data from one or more sets of sensors and/or apparatuses. The collected data is processed and stored by the data processing system 206. The data processing system 206 determines whether a change in inputs has occurred. As needed, the suspension control system 208 sends control signals to make adjustments to the suspension based on changes in the collected data. According to some examples, the control signals and/or the stored data are exchanged over the network 210. More detailed examples of the data collection system 204, data processing system 206, and suspension control system 208 are discussed in relation to FIG. 4.

The system 200 includes at least one user system 212, each of which may host multiple applications, including an application 216. Each user system 212 may include one or more user devices, such as a computer user device 222, that is communicatively connected to exchange data. The application 216 provides processing and enables communication with the network 210. According to some examples, the application is a local client of a system or module described herein, and the application 216 is configured to provide the same processing and functionality.

The user system 212 includes a display 218 configured to display at least a user interface. According to some examples, the display 218 is integrated into the one or more user devices, such as the computer user device 222. The display 218 may be external to the user system 212 and be communicatively connected to the user system 212.

The bike system 202 and the user system 212 are connected with the network server system 220 via the network 210. The data exchanged between the one or more bike systems 202 and the one or more user systems 212 and the network server system 220 includes functions (e.g., commands to invoke functions) and payload data (e.g., text, audio, video, or other multimedia data).

The network server system 220 provides server-side functionality via the network 210 to the bike system 202 and the user system 212. While certain functions of the system 200 are described herein as being performed by one of the bike system 202, the user system 212, or the network server system 220, the location of certain functionality may be a design choice. For example, it may be technically preferable to initially deploy particular technology and functionality within the network server system 220 but to later migrate this technology and functionality to the application 216 where a user system 212 has sufficient processing capacity.

The network server system 220 supports various services and operations that are provided to the bike system 202 and the user system 212. Such operations include transmitting data to, receiving data from, and processing data generated by the bike system 202, the user system 212 and/or third-party servers 214. This data may include one or more sets of sensor data, rider information, client device information, geolocation information, and other metadata. Data exchanges within the system 200 are invoked and controlled through functions available via user interfaces (UIs) of the application 216 and/or the data processing system 206.

The network server system 220 includes one or more network servers 224 that provide processing functionality, making the functions of the network server system 220 accessible to the bike system 202, the user system 212, and/or the third-party server 214. The network servers 224 are communicatively coupled to a database server 226, facilitating access to a database 228 that stores data associated with interactions processed by the network servers 224. Similarly, the network servers 224 provides web-based interfaces and APIs, according to some examples. To this end, the network servers 224 process incoming network requests over the Hypertext Transfer Protocol (HTTP) and several other related protocols.

The network server system 220 receives and transmits interaction data (e.g., commands and data payloads) between the network servers 224 and the clients (for example, the data processing system 206) and the third-party server 214. Specifically, the network server system 220 provides a set of interfaces (e.g., routines and protocols) that can be called or queried to invoke functionality of the network third-party servers 214. The network server system 220 exposes various functions supported by the network servers 224, including account registration; login functionality; the sending of data, via the network servers 224, from a particular user system 212; the communication of files from the bike system 202 to the network servers 224; the metadata of a collection of data; the storage or retrieval of a data from the database 228.

FIG. 3A-FIG. 3E illustrate a plurality of components of the data collection system 204, according to some examples. The plurality of components include various sensors and apparatuses for collecting data. Each component of the plurality of components may be included or excluded in various embodiments. Descriptions provided herein are for completeness and are not meant to be limiting.

As used herein, concepts of stress and strain are understood to be related measurements. Strain as used herein relates to elastic deformation of materials. Accordingly, strain is proportional to stress, and stress is proportional to net applied forces. That is, strain and stress measurements are largely substitutable in the data collection system 204, as stress can be derived from strain, and vice versa. Descriptions herein of measuring strain or stress are not meant to be limiting, and any description of one may be supplanted by the other, as understood to one of ordinary skill in the art.

Figure 3A:
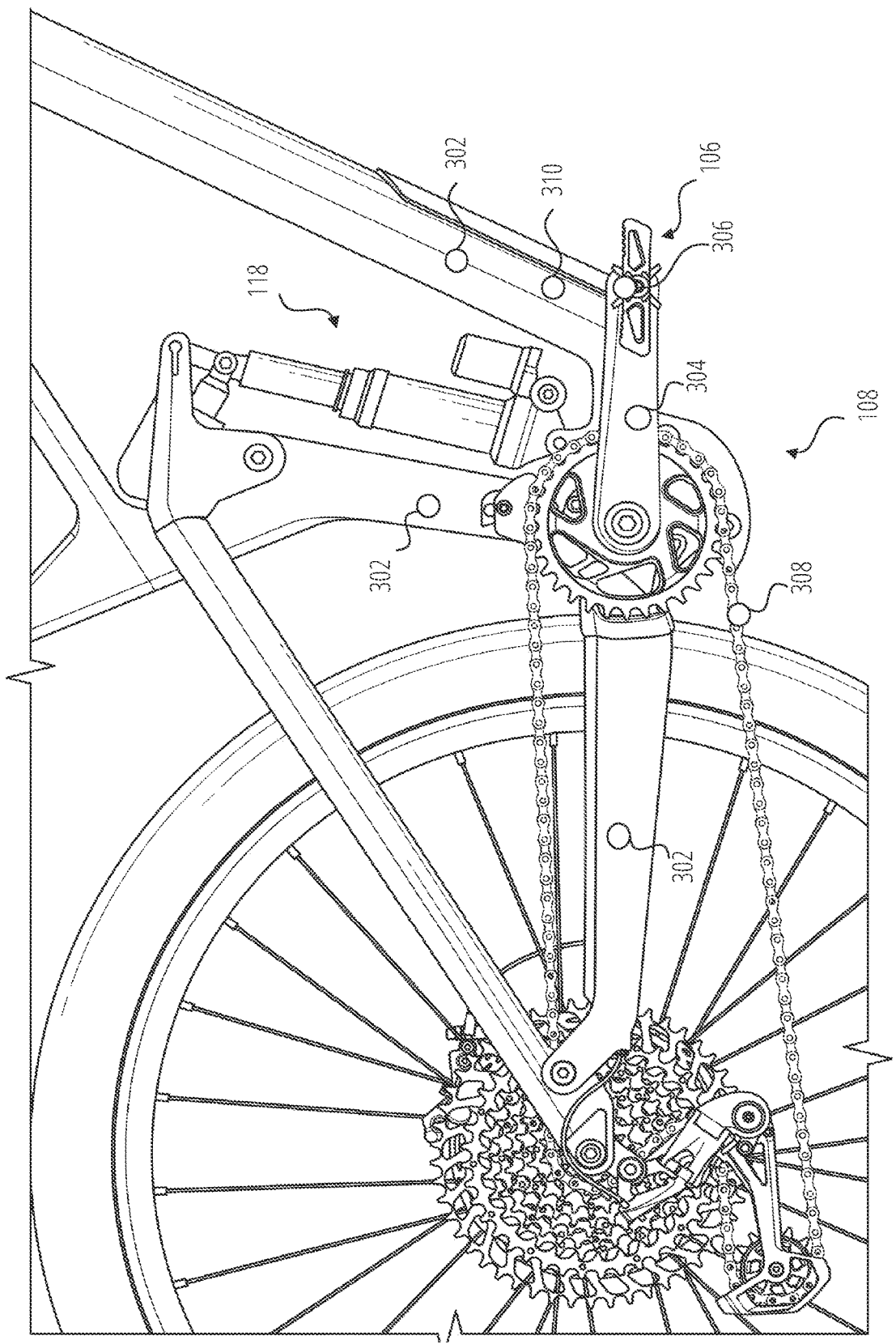
FIG. 3A illustrates part of a data collection system, in accordance with some examples.

FIG. 3A illustrates part of the data collection system 204, in accordance with some examples. In particular, FIG. 3A illustrates various components of the data collection system 204 on and around the pedal 106 and crank 108 of the mountain bike 100.

The data collection system 204 includes a one or more crank sensors 302 as well as at least one crank emitter 304, according to some examples. The crank emitter 304 is configured to emit a signal; the crank sensors 302 are configured to sense the signal emitted by the crank emitter 304. The one or more crank sensors 302 and the at least one crank emitter 304 are components of a crank position apparatus. The crank position apparatus is configured to determine the position of the crank 108 and a speed of the crank 108, according to some embodiments.

The crank sensors 302 are located at different positions on the frame 102 about the crank 108, such that the crank 108 will pass by the crank sensors 302 as the crank 108 moves. For example, as depicted in FIG. 3A, there are three crank sensors 302 each located on a different part of the frame 102 around the crank 108: one on the chain stay, one on the seat tube, and one on the down tube. Additionally or alternatively, a crank sensor 302 is located on the bottom bracket of the crank 108. The crank emitter 304 is located on the crank 108, as depicted in FIG. 3A. More specifically, the crank emitter 304 is located on the non-drive side crank 108, according to some examples.

As the rider pedals, the crank 108 circles and passes by each crank sensor 302. Each crank sensor 302 measures and logs one or more signals from the crank emitter 304 each time the crank 108 passes the respective crank sensor 302. The data collection system 204 collects these data logged by each of the one or more crank sensors 302. Alternatively, the locations of the crank sensors 302 and the crank emitter 304 may be inverted. That is, at least one sensor is located on the crank 108 and one or more emitters are located about the crank 108 on the frame 102. As the crank 108 moves, the sensor on the crank 108 logs data as it passes each emitter on the frame 102. In either embodiment, the data logged by the sensors for the data collection system 204 is used to determine the position and movement of the crank 108. The position and movement of the crank 108 are used to find the speed, frequency, and period of the bike's suspension oscillation.

According to some examples, the crank emitter 304 is a magnet and the crank sensors 302 are magnetic sensors (e.g., Hall effect sensor). The crank sensors 302 may be any type of position or proximity sensors, such as: inductive sensor, fiberoptic position sensor, optical position sensor, ultrasonic sensor, among others. The crank emitter 304 may be any type of signal emitter capable of being sensed by the crank sensor 302, such as: a magnet, a laser, a speaker or other sound emitter, among others.

The data collection system 204 includes at least one pedal sensor 306, according to some examples. The pedal sensor 306 is configured to collect data relating to strain on the pedal 106. As depicted in FIG. 3A, the pedal sensor 306 is located on or near the pedal 106. An example of the pedal sensor 306 is described in further detail in relation to FIG. 3E.

The data collection system 204 includes at least one chain sensor 308, according to some examples. The chain sensor 308 is configured to periodically measure and log data relating to strain on the chain 110. The chain sensor 308 is located on the chain 110. More specifically, the chain sensor 308 is located between two chain links of the chain 110, according to some examples. As the rider pedals, the chain sensor 308 measures and logs strain on the chain 110. The strain on the chain 110 is directly proportional to the rider's pedaling force. Accordingly, the logged chain strain data is used to determine the rider's pedaling forces over time. The pedaling forces over time are used to determine the frequency, amplitude, period, and speed of the oscillation of the suspension.

According to some examples, the chain sensor 308 is a piezoelectric sticker. The chain sensor 308 may be any type of stress sensor, strain sensor, or pressure sensor, such as: a piezoresistive strain gauge, a capacitive pressure sensor, an electromagnetic pressure sensor, a strain gauge, an optical strain sensor, a resonant frequency stress sensor, a thermal conductivity pressure sensor, among others.

The data collection system 204 includes at least one frame sensor 310, according to some examples. The frame sensor 310 is configured to periodically measure and log data relating to strain on the frame 102 or a portion thereof. The frame sensor 310 is located on the frame 102. For example, as depicted in FIG. 3A, the frame sensor 310 is located on the down tube of the frame 102, near the crank 108. According to some examples, the data collection system 204 includes more than one frame sensor 310, each located on a different part of the frame 102.

Each frame sensor 310 measures strain on the frame 102 at the location of the frame sensor 310 and logs the strain data over time. When the rider pedals, the pedaling forces impart stress onto the frame 102, causing strain (e.g., deflection) of parts of the frame 102. The logged strain data is used to determine the force, velocity, and/or power (e.g., amplitude) of the rider's pedal strokes as well as the timing of the rider's pedal strokes (e.g., period).

According to some examples, the frame sensor 310 is a piezoelectric sticker. The frame sensor 310 may be any type of sensor previously discussed in relation to the chain sensor 308.

As discussed herein, each sensor may include an associated thermal sensor. In examples where a particular sensor is a piezoelectric sticker, an associated thermal sensor is used to ensure accuracy of the strain reading as the piezoelectric effect is impacted by temperature changes. The associated thermal sensor may be embedded in the particular sensor or otherwise be an external thermal sensor nearby the particular sensor. Each associated thermal sensor is configured to periodically measure and log temperature. According to some examples, the associated thermal sensor is a thermocouple, a resistance temperature detector, a thermistor, a thermometer, an infrared temperature sensor, or the like.

Figure 3B:
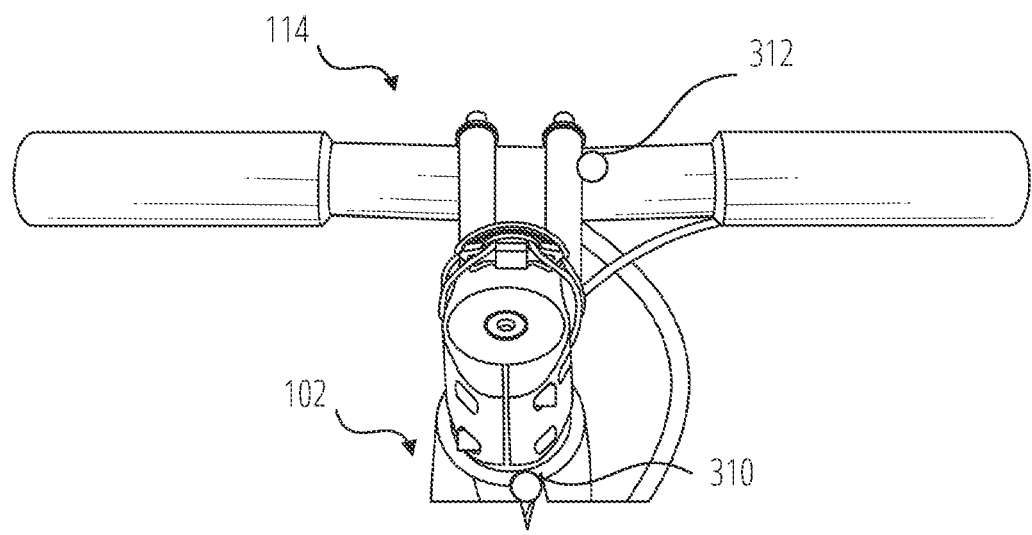
FIG. 3B illustrates part of the data collection system, in accordance with some examples.

FIG. 3B illustrates part of the data collection system 204, in accordance with some examples. In particular, FIG. 3B illustrates various components of the data collection system 204 on and around the handlebars 114 of the mountain bike 100. FIG. 3B is illustrated from the perspective of the rider viewing the handlebars 114 and top portion of the top tube and steerer tube 140 of the frame 102.

As illustrated in FIG. 3B, the frame 102 includes a second frame sensor 310 on the top tube near the joint with the handlebars 114 and steerer tube 140, according to some examples. The second frame sensor 310 on the frame 102 provides additional data points for determining the force, velocity, power and/or period of the rider's pedal stokes.

According to some examples, the chain sensor 308 is a link in the chain 110. For example, the link may be specially manufactured to include any of the previously discussed examples of the chain sensor 308 and inserted into the chain 110. For example, the link includes a piezoelectric sensor as the chain sensor 308. In some examples, the chain sensor 308 link is inserted into the chain 110 as part of the manufacturing process of the chain 110. The data collection system 204 includes at least one handlebar sensor 312, according to some examples. The handlebar sensor 312 is configured to periodically measure and log data relating to strain on the handlebars 114 or a portion thereof. The handlebar sensor 312 is located on the handlebars 114. As depicted in FIG. 3B, for example, the handlebar sensor 312 is positioned near the joint with the frame 102 where handlebar strain is maximized. According to some examples, the data collection system 204 includes two handlebar sensor 312, one located on either handlebar 114.

Particularly in a sprint or other situation that requires hard pedaling from the rider, the mountain bike 100 tends to move side-to-side along the axis created by the contact the front wheel 104b and 104a make with the ground. The rider may use the handlebars 114 for support in the side-to-side motion, imparting additional forces onto the handlebars 114. Each handlebar sensor 312 measures strain on the handlebars 114 at the location of the handlebar sensor 312 and logs the strain data. The handlebar strain data is used to determine the force of the rider's pedaling.

According to some examples, the handlebar sensor 312 is a piezoelectric sticker. The handlebar sensor 312 may be any type of sensor previously discussed in relation to the chain sensor 308.

Figure 3C:
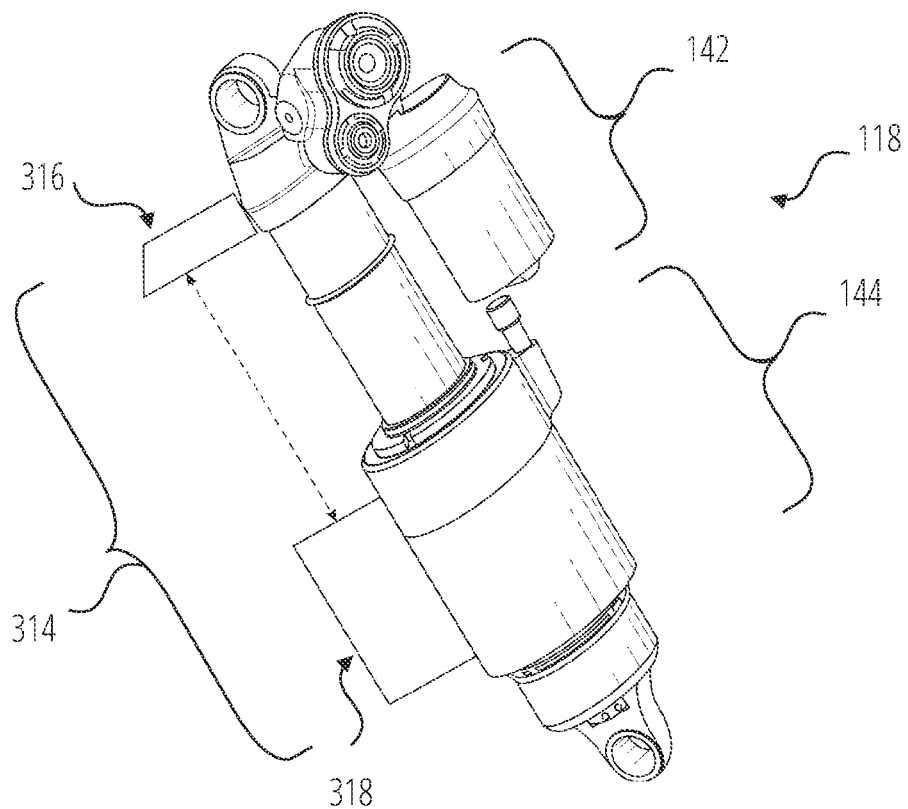
FIG. 3C illustrates part of the data collection system, in accordance with some examples.

FIG. 3C illustrates part of the data collection system 204, in accordance with some examples. In particular, FIG. 3C illustrates various components of the data collection system 204 on and around the shock 118 of the mountain bike 100. The shock 118 is illustrated unconnected to the frame 102 for clarity.

The data collection system 204 includes at least one displacement measurement apparatus 314, according to some examples. The displacement measurement apparatus 314 is configured to periodically measure and log the displacement of the shock 118. The displacement measurement apparatus 314 is attached to the shock 118. As depicted in FIG. 3C, the displacement measurement apparatus 314 is positioned on the exterior of the shock, according to some examples. Alternatively, the components of the displacement measurement apparatus 314 may be on the interior of the shock 118, according to some examples.

As depicted in FIG. 3C, the displacement measurement apparatus 314 contains two sub-components: an upper displacement measurement component 316 and a lower displacement measurement component 318, according to some examples. The upper displacement measurement component 316 is located superior to the stanchion 142. In the example depicted in FIG. 3C, the upper displacement measurement component 316 is near the compression adjustment apparatus 146 and rebound adjustment apparatus 148 and opposite the piggyback reservoir 152. The lower displacement measurement component 318 is located on the main body 144.

The displacement measurement apparatus 314 takes measurements of the displacement of the shock 118 and logs the displacement data. The displacement data of the shock 118 is the shortest distance between the upper displacement measurement component 316 and the lower displacement measurement component 318. According to some examples, the displacement measurement apparatus 314 takes an initial displacement measurement of the sprung weight of the mountain bike 100. The initial displacement measurement is used as a baseline to determine compressive or extensive displacement of the shock 118 when riding.

According to some examples, the lower displacement measurement component 318 contains a laser displacement sensor, which is used to determine the displacement of the upper displacement measurement component 316. Alternatively, the laser displacement sensor may be contained in the upper displacement measurement component 316. The displacement measurement apparatus 314 may be any type of linear displacement measurement system, such as a mechanical displacement measurement apparatus (e.g., a slide ruler), an electromechanical displacement measurement apparatus (e.g., a linear variable differential transformer, a linear encoder), an optical displacement measurement apparatus (e.g., LiDAR), or any other linear encoder device.

While the displacement measurement apparatus 314 is described herein in relation to the shock 118, it should be appreciated that a substantially similar displacement measurement apparatus 314 is included on the fork 116, according to some examples. The displacement measurement apparatus 314 on the fork 116 retains the same components and functionality as the displacement measurement apparatus 314 on the shock 118. Instead of the lower displacement measurement component 318 being attached to the main body 144, the lower displacement measurement component 318 would attach to a leg 120 of the fork, according to some examples.

Figure 3D:
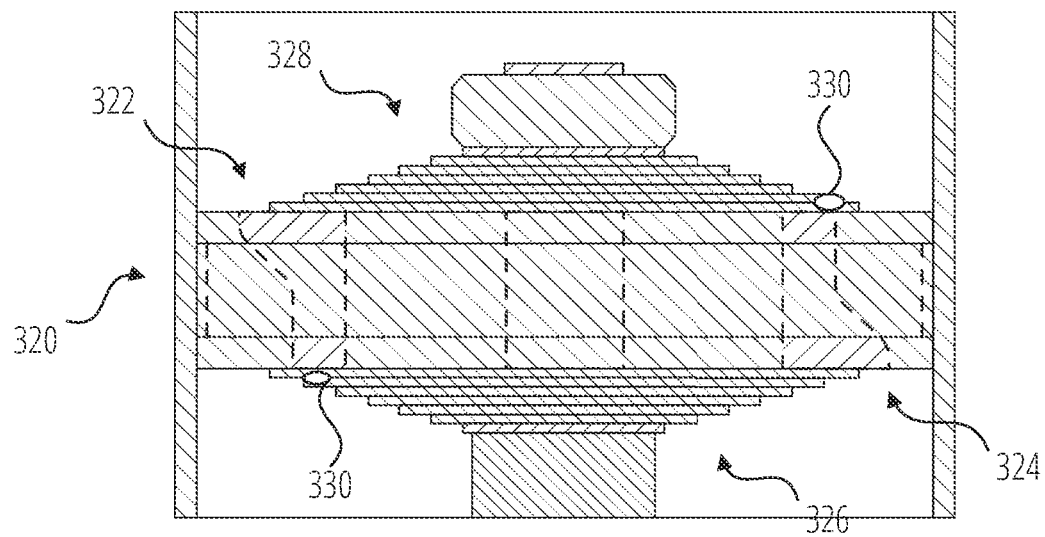
FIG. 3D illustrates part of the data collection system, in accordance with some examples.

FIG. 3D illustrates part of the data collection system 204, in accordance with some examples. In particular, FIG. 3D illustrates a piston 320 of a damper in a suspension, such as the interior of the damper chamber 124 of the fork 116 or in the interior of the main body 144 of the shock 118.

As depicted in FIG. 3D, the piston 320 includes one or more orifices for fluid to travel through, including at least one compression orifice 322 and at least one rebound orifice 324, according to some examples. Fluid travels through the compression orifice 322 when the suspension is compressed with sufficient force. Fluid travels through the rebound orifice 324 when the suspension rebounds with sufficient force. According to some examples, the orifices, including the compression orifice 322 and the rebound orifice 324 have adjustable diameters. According to some examples, the adjustable diameter orifices are part of the suspension control system 208.

As depicted in FIG. 3D, the piston 320 includes a number of compression shims 326 and a number of rebound shims 328, according to some examples. The compression shims 326 and the rebound shims 328 control fluid flow in the damper and are designed to deflect under force. The compression shims 326 may cover part or all of an opening to the compression orifice 322, such that when compressed with sufficient force the compression shims 326 flex away from the opening to the compression orifice 322 to enable more fluid to flow through the compression orifice 322. The rebound shims 328 may cover part or all of an opening to the rebound orifice 324, such that when rebounding with sufficient force the rebound shims 328 flex away from the opening to the rebound orifice 324 to enable more fluid to flow through the rebound orifice 324. The precise number of and morphology of the compression shims 326 and the rebound shims 328 may vary in accordance with some examples. The amount of force require to deflect the compression shims 326 and/or the rebound shims 328 directly impacts the damper constant of the damper.

The data collection system 204 includes at least one shim sensor 330, according to some examples. For example, as depicted in FIG. 3D, the piston 320 includes a shim sensor 330 on the compression shims 326 and a shim sensor 330 on the rebound shims 328. Each shim sensor 330 is configured to periodically measure and log strain (e.g., extent of deflection) of the respective shim. The shim strain data is used to determine the force being applied to the shims for a known damper constant. Accordingly, the logged shim strain data is used to determine speed, frequency, and period of movement of the suspension component directly from within the suspension component.

According to some examples, the shim sensor 330 is a piezoelectric sticker. The shim sensor 330 may be any type of sensor previously discussed in relation to the chain sensor 308.

Figure 3E:
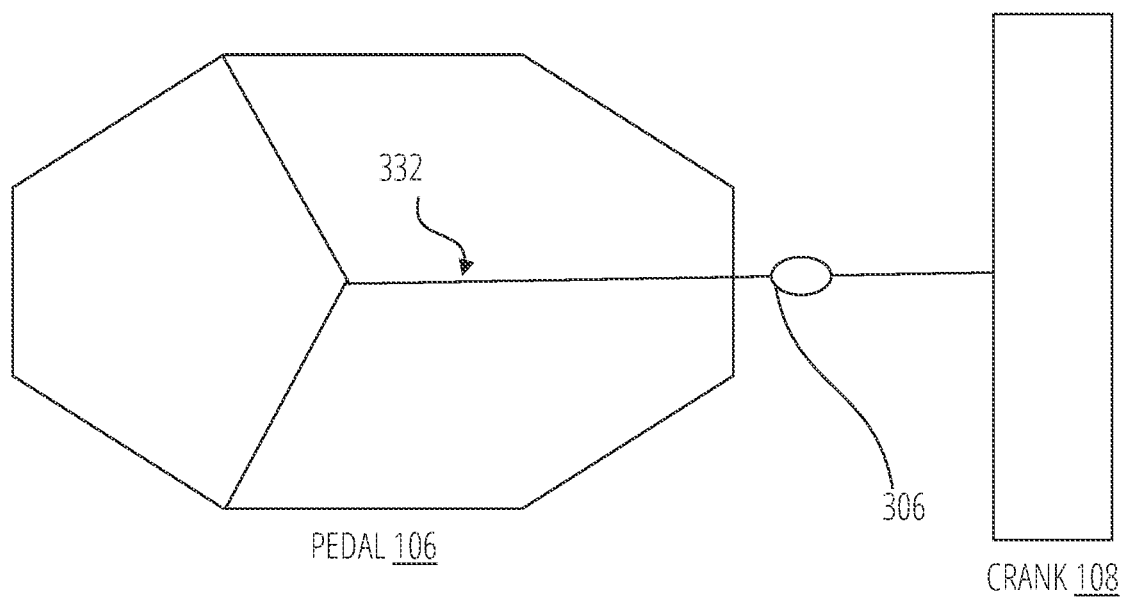
FIG. 3E illustrates part of the data collection system, in accordance with some examples.

FIG. 3E illustrates part of the data collection system 204, in accordance with some examples. In particular, FIG. 3E illustrates components of the data collection system 204 on and around the pedal 106 of the mountain bike 100. The pedal 106 and crank 108 are illustrated unconnected to the frame 102 for clarity.

The pedal 106 is connected to the crank 108 by a pedal axle 332. The pedal sensor 306 is located on the pedal axle 332, according to some examples. In the example illustrated in FIG. 3E, the pedal sensor 306 is positioned along the pedal axle 332 between the pedal 106 and the crank 108. According to other examples, the pedal sensor 306 is positioned on the pedal 106.

The pedal sensor 306 periodically measures and logs strain being applied to the pedal 106 and/or pedal axle 332. Given that the strain imparted onto the pedal 106 comes from the rider's pedaling force, the logged pedal strain data is used to determine the force of the rider's pedaling stroke over time. According to some examples, the pedal sensor 306 is calibrated for the rider's weight. The pedaling force is used to determine the frequency, amplitude, period, and speed of the oscillation of the suspension.

According to some examples, the pedal sensor 306 is a piezoelectric sticker. The pedal sensor 306 may be any type of sensor previously discussed in relation to the chain sensor 308.

Figure 4:
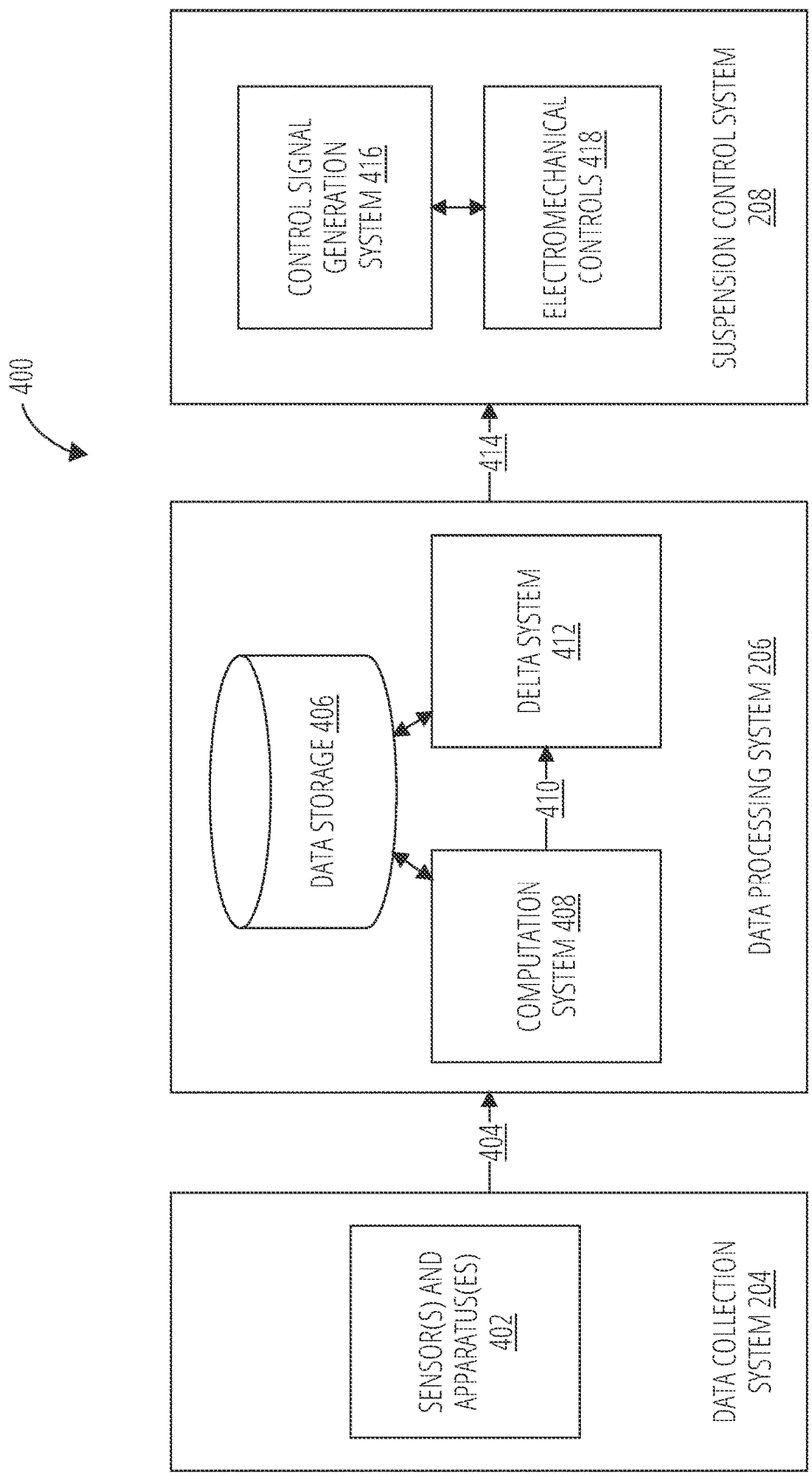
FIG. 4 is a diagrammatic representation of an example bike system, according to some examples.

FIG. 4 is a diagrammatic representation of an example bike system 400, according to some examples. The bike system 400 comprises an example of the bike system 202. The bike system 400 includes the data collection system 204, the data processing system 206, and the suspension control system 208. The bike system 400 illustrates a flow of data. According to some examples, the flow of data may be more circuitous than the linear flow depicted, and multiple operations may occur concurrently. Additionally, or alternatively, there may be additional or fewer components that compose the bike system 400 than illustrated in FIG. 4.

The data collection system 204 includes one or more sensors and apparatuses 402. The sensors and apparatuses 402 can include one or more of any of the sensors and apparatuses discussed in FIG. 3A-FIG. 3E: the crank position apparatus (the crank sensor 302 and the crank emitter 304), the pedal sensor 306, the chain sensor 308, the frame sensor 310, the handlebar sensor 312, the displacement measurement apparatus 314, the shim sensor 330, or any combination thereof. In one example, the sensors and apparatuses 402 include the pedal sensor 306, the displacement measurement apparatus 314, and the crank position apparatus (the crank sensor 302 and the crank emitter 304).

The data collection system 204 collects data 404 via the sensors and apparatuses 402. The data 404 is, for example, collected periodically from the sensors and apparatuses 402. The period of collection may vary according to the configuration of each sensor. Additionally, or alternatively, the data collection system 204 has a predetermined collection period and collects data from each of the sensors and apparatuses 402 every predetermined period. The data 404 collected by the data collection system 204 is provided to the data processing system 206.

The data processing system 206 processes data 404 received from the data collection system 204. The data processing system 206 determines forces (e.g., net forces) and other values (e.g., wave characteristics) from the input data 404 collected. For example, the forces and other values capable of being computed by the data processing system 206 can comprise any of the forces and stresses that have been previously discussed in relation to FIG. 3A-FIG. 3E The data processing system 206 generates one or more outputs that indicate a change in the data 404 inputs. In the example bike system 400, the data processing system 206 generates a delta 414 indicating the difference between the recent data 404 collected recently and some previous data collected by the data collection system 204. The data processing system 206 includes a data storage 406, a computation system 408, and a delta system 412, according to some examples.

The data storage 406 stores data. According to some examples, the data processing system 206 receives data from the various components of the data collection system 204. The data received is stored in the data storage 406. Additionally, or alternatively, data that has been processed by the data processing system 206 and outputs generated by the data processing system 206 are stored in the data storage 406.

The computation system 408 processes the data 404 to determine a set of wave characteristics 410. The wave characteristics 410 include one or more values representing the movement of one or more components of the bike system 400 as the rider pedals. The set of wave characteristics 410 can be represented as a vector or an array, according to some examples. For example, the movement of the suspension can be represented by a standing wave or other sinusoidal function, called a "suspension oscillation wave" herein. That is, as the rider is imparting sinusoidal pedaling forces, in the absence of obstacles or other variable forces, the resultant movement of the bike system 400 (and physical components thereof, such as the sensors and apparatuses 402) is also sinusoidal. The wave characteristics 410 include any values derived from the data 404 that represent a characteristic of a sinusoid, such as wavelength, frequency, angular frequency, speed, angular speed, amplitude, period, crest length, trough length, and other similar representations of a wave.

According to some examples, the computation system 408 determines wave characteristics 410 representative of movement of the respective sensors and apparatuses 402 that measured each input data 404. For example, strain measurements on the chain sensor 308 are directly proportional to the rider's pedaling forces. Thereby, the computation system 408 can determine the rider's sinusoidal pedaling forces based on the data 404 collected by the chain sensor 308. For example, the computation system 408 can determine the frequency of the rider's pedaling forces by determining a period of the data 404 collected by the chain sensor 308

According to some examples, the computation system 408 determines wave characteristics 410 that represent the suspension oscillation wave. For example, the wave characteristics 410 includes one or more wave characteristics, such as a frequency, an amplitude, and a period of the motion of the suspension (e.g., fork 116 and/or shock 118).

The computation system 408 determines the wave characteristics 410 based on recent data 404 stored in the data storage 406. According to some examples, the recent data 404 includes the most recent data collection period. According to some examples, the recent data 404 includes several of the most recent data collection periods (e.g, several data points). The number of recent data collection periods can be predetermined (e.g., 5 most recent collection periods). The computation system 408 processes the data 404 based on the particular sensors and apparatuses 402 providing data 404 to determine one or more wave characteristics of the wave characteristics 410.

For example, the amplitude of the wave characteristics 410 is determined by the computation system 408 based on data 404 collected by the displacement measurement apparatus 314, according to some examples. For example, the difference between the maximum displacement and minimum displacement measured by the displacement measurement apparatus 314 over a period is the amplitude of the wave characteristics 410. According to some examples, the amplitude is based on an average over several periods (e.g., a predetermined number of periods).

In another example, the frequency of the wave characteristics 410 is determined by the computation system 408 based on the crank position apparatus (e.g., crank sensor 302 and crank emitter 304). For example, the crank apparatus periodically measures and logs the position of the crank 108 as it travels circularly. The frequency of the crank emitter 304 passing a particular crank sensor 302 is the frequency of the circular motion of the crank 108. According to some examples, the computation system 408 determines the frequency of a wave characteristics 410 of frequency by determining the frequency of the crank 108 from the data 404 collected by the crank sensor 302. Thus, the computation system 408 determines the frequency of the wave characteristics 410 based on the crank 108.

Additionally, or alternatively, each data collected from each sensor can have a sinusoidal shape when plotted over time. According to some examples, the computation system 408 determines the wave characteristics 410 based on sinusoids generated from the data 404 of one or more sensors and apparatuses 402, according to some embodiments. For example, the period of the data 404 from the chain sensor 308 is the period of the wave characteristics 410. Further, the computation system 408 can determine the frequency by the inverse of the period. According to some examples, the computation system 408 determines an average period based on that of each sensor to determine the period of the wave characteristics 410.

The wave characteristics 410 are stored by the data processing system 206 in data storage 406, according to some examples. The delta system 412 receives the most recent wave characteristics 410. According to some examples, the computation system 408 provides the wave characteristics 410 to the delta system 412. In other examples, the data storage 406 provides the wave characteristics 410 to the delta system 412. The data storage 406 provides one or more previous suspension oscillation waves to the delta system 412.

The delta system 412 determines a delta 414 between the set of current wave characteristics 410 and one or more sets of previous wave characteristics 410.

The one or more sets of previous wave characteristics 410 are wave characteristics 410 previously computed by the computation system 408. The one or more sets of previous wave characteristics 410 each represent suspension oscillation waves, according to some examples. According to some examples, the number of sets of previous wave characteristics 410 is a predetermined number (e.g., 5 most recent sets of previous wave characteristics 410). According to some examples, there is one set of previous wave characteristics 410 that is an average of a predetermined number of the most recent sets of previous wave characteristics 410 (e.g., the average of the 5 most recent sets of previous wave characteristics 410). According to some examples, one or more sets of previous wave characteristics 410 are historical data from earlier in the ride or one or more previous rides.

The delta 414 represents a change between the current wave characteristics 410 and the one or more sets of previous wave characteristics 410. According to some examples, the delta 414 represents a difference in more than one wave characteristic, and accordingly, the delta 414 can be represented as a vector. That is, the delta 414 vector contains multiple scalar values, each scalar representing a delta (e.g., change) in a particular wave characteristic of the wave characteristics 410. For example, the delta 414 is a vector representing two wave characteristics: amplitude and frequency. The delta 414 vector contains a first value representing a difference in amplitude between the current wave characteristics 410 and one or more previous suspension oscillation waves, and a second value representing a respective difference in frequency. If there is no change in any wave characteristic in the set of wave characteristics 410, the delta 414 can be represented as a scalar zero or a vector zero, according to some examples.

The data processing system 206 provides the delta 414 to the suspension control system 208, according to some examples. The suspension control system 208 uses the delta 414 to automatically generate and send controls for the suspension, if applicable. The suspension control system 208 includes a control signal generation system 416 and one or more electromechanical controls 418.

The control signal generation system 416 uses the delta 414 to determine whether the bike system 400 has encountered an obstacle. According to some examples, the control signal generation system 416 determines whether the delta 414 exceeds a threshold. The threshold indicates the bike system 400 has likely encountered an obstacle. The control signal generation system 416 compares the delta 414 to the threshold. The delta 414 exceeding the threshold indicates the rider has likely struck an obstacle. The delta 414 not exceeding the threshold indicates the rider has likely not struck an obstacle, or has struck a small obstacle.

According to some examples, the threshold comprises multiple values, a range of values, or multiple ranges of values. The threshold may take the form of a scalar value, a set of values (e.g., an array), a vector, a set of vectors, or other data structures as applicable for comparing the delta 414 to the threshold(s). For example, returning to the example where the delta 414 is a two-dimensional vector representing a change in amplitude and a change in frequency, the threshold includes at least a two-dimensional vector. For example, the threshold vector includes a threshold amplitude change and a threshold frequency change, according to some examples. The control signal generation system 416 compares the change in amplitude of the delta 414 to the threshold amplitude change. The control signal generation system 416 compares the change in frequency of the delta 414 to the threshold frequency change. According to some examples, if the respective value in the delta 414 vector exceeds its respective threshold value, the delta 414 exceeds the threshold.

According to some examples, the control signal generation system 416 determines the magnitude of the difference between the delta 414 and the threshold. The magnitude is determined, for example, in comparing the delta 414 to the threshold. That is, the difference between the threshold and the delta 414 indicates the magnitude.

The control signal generation system 416 generates a set of control signals based on comparing the delta 414 to the threshold. According to some examples, the set of controls is further based on the magnitude. The control signal generation system 416 is coupled with the electromechanical controls 418, such that the control signal generation system 416 provides the set of control signals to the electromechanical controls 418. According to some embodiments, the electromechanical controls 418 provide feedback to the control signal generation system 416. Additionally, or alternatively, the control signal generation system 416 generates the set of control signals further based on the feedback from the electromechanical controls 418.

The electromechanical controls 418 are one or more physical components that control the settings of the suspension. The electromechanical controls 418 include, for example, the position of the piston in the piggyback reservoir 152, the adjustable diameter of orifices in a piston (e.g., compression orifices 322, rebound orifices 324), the adjustable shims in a piston, the position of a secondary piston opposing a primary piston in a damper, among others.

In the event of an obstacle, the control signal generation system 416 generates a set of control signals to configure the bike system 400 to provide increased shock absorption for the obstacle (e.g., constructive interference). In the absence of an obstacle, the control signal generation system 416 generates a set of controls as applicable to maintain the suspension oscillation wave (or wave characteristics thereof). For example, these control signals may increase the stiffness of the suspension to maintain the suspension oscillation wave, decrease the stiffness of the suspension to maintain the suspension oscillation wave, or make no changes to the settings of the suspension in order to maintain the suspension oscillation wave. Further examples are discussed below.

For example, if the delta 414 does not exceed the threshold, then the control signal generation system 416 generates a set of control signals to cause destructive interference, according to some examples. That is, the change in the wave characteristics 410 does not indicate an obstacle, and, in response, the control signal generation system 416 generates signals to prevent the suspension from compressing further. One method of preventing the suspension from compressing further is to create destructive interference inside the damper chamber of the suspension. For example, the control signal generation system 416 causes destructive interference by generating a first control signal to the adjustable shims to close out the adjustable shims (e.g., prevent the shims from deflecting), and generating a second control signal to decrease the diameter of the adjustable diameter orifices in the piston. The electromechanical controls 418, including the adjustable shims and the adjustable diameter orifice, execute this set of control signals to create destructive interference and resist the suspension compressing. Thereby, more of the rider's pedaling forces are translated into forward movement (e.g., increase speed) rather than oscillating the suspension.

In some examples, if the delta 414 does not exceed the threshold, then the control signal generation system 416 does not generate a set of control signals. For example, if the change to the wave characteristics 410 is small, the settings of the suspension do not need to be changed by the electromechanical controls 418 in order to maintain the suspension oscillation wave, according to some examples.

In another example, the delta 414 is determined by the control signal generation system 416 to exceed the threshold and the control signal generation system 416 generates a set of control signals for the electromechanical controls 418. That is, the bike system 400 has likely encountered an obstacle and the suspension should be enabled to compress further. According to some examples, the control signal generation system 416 generates constructive interference in the damper chamber of the suspension to enable increased movement of the suspension (e.g., further compression). For example, the control signal generation system 416 generates a control signal to increase the diameter of the adjustable diameter orifices in the piston. The electromechanical controls 418 execute this control signal, facilitating compression in the damper chamber.

According to some examples, the magnitude of difference is used by the control signal generation system 416 in generating a set of control signals for the electromechanical controls 418. For example, given a large magnitude, the control signal generation system 416 generates a larger number of control signals (e.g., change more suspension settings) and/or generates control signals with larger magnitudes (e.g., greater changes in a suspension setting), and vice versa for a small magnitude.

According to some examples, feedback from the electromechanical controls 418 is used by the control signal generation system 416 in generating the set of control signals. For example, the electromechanical controls 418 provides feedback that the adjustable diameter orifices are at their minimum diameter. Based on this information, the control signal generation system 416 generates alternate control signals to generate destructive interference as applicable.

Figure 5A:
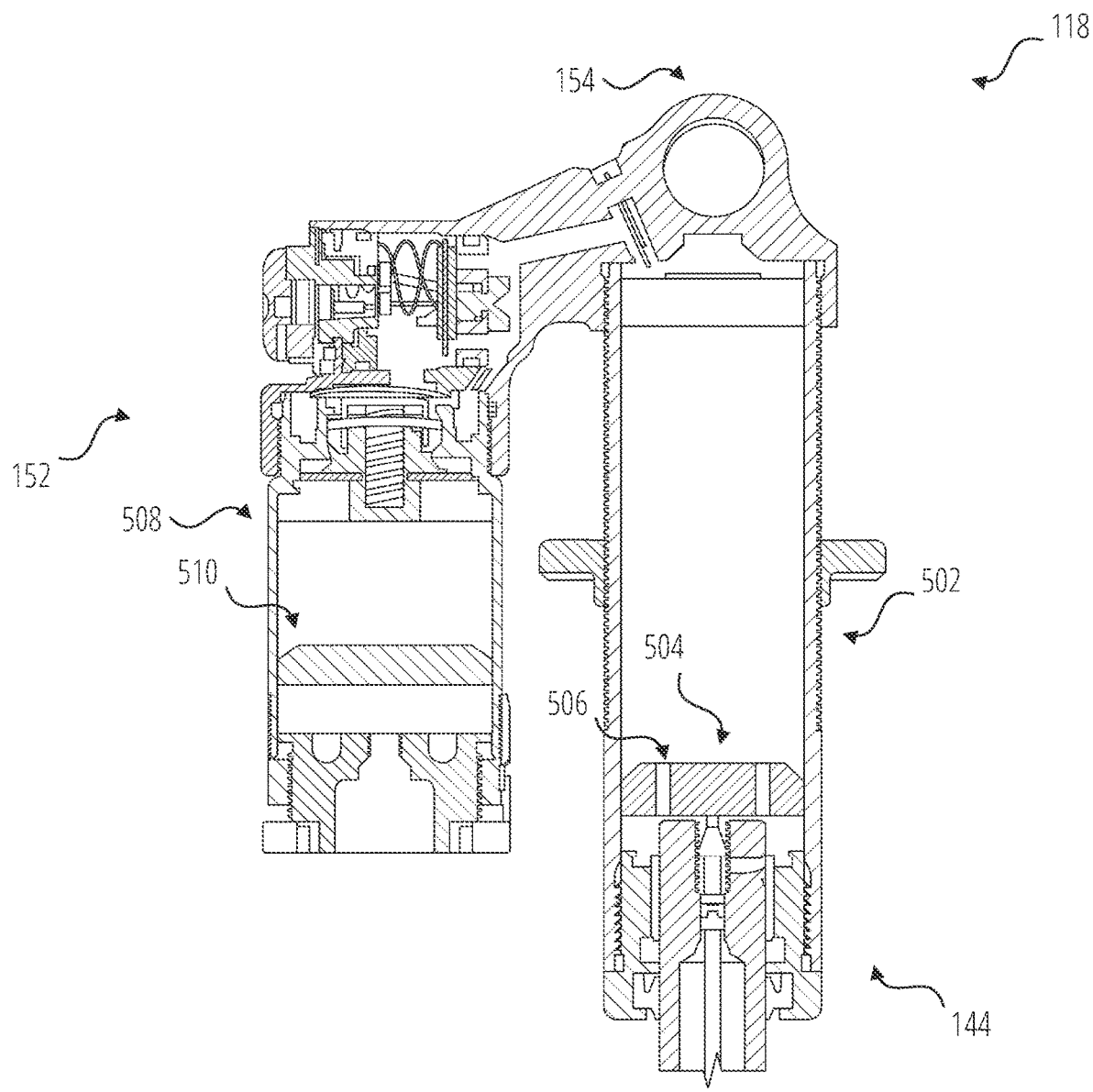
FIG. 5A illustrates part of an example cross-sectional interior of a shock, in accordance with some examples.
Figure 5B:
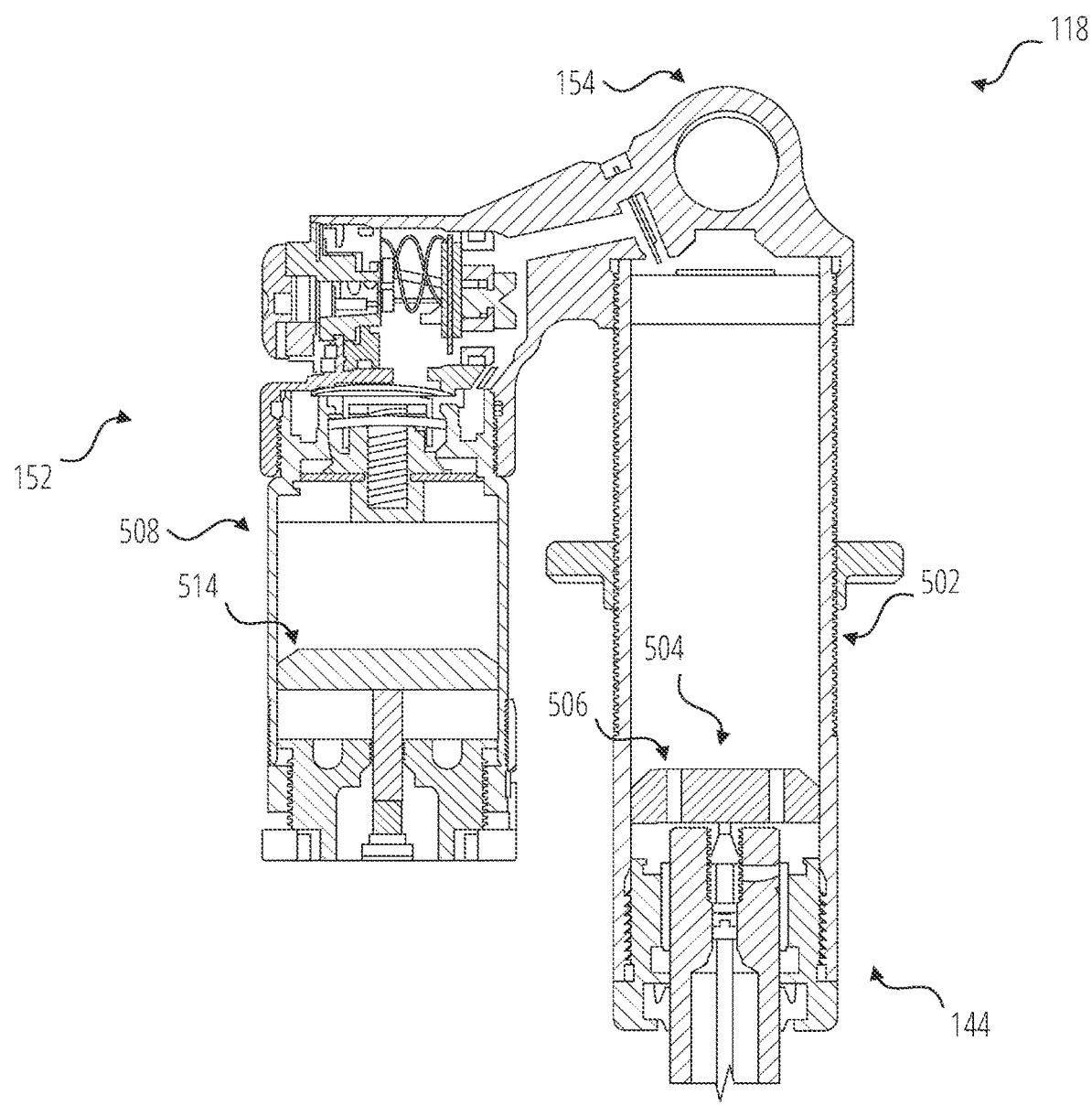
FIG. 5B illustrates part of an example cross-sectional interior of a shock, in accordance with some examples.

Some example physical components of the electromechanical controls 418 are discussed in further detail in relation to FIG. 5A and FIG. 5B.

FIG. 5A illustrates part of an example cross-sectional interior of the shock 118, in accordance with some examples. As discussed previously, the shock 118 includes a main body 144 and a piggyback reservoir 152. Inside the main body 144 is a primary damper chamber 502 with a primary piston 504. The primary piston 504 includes a number of adjustable diameter orifices 506. Inside the piggyback reservoir 152 is a piggyback chamber 508 with a piggyback piston 510. According to some examples, the primary piston 504 comprises an example of the piston 320 of FIG. 3D. In the example illustrated in FIG. 5A, the piggyback piston 510 is an internal floating piston (IFP).

The primary piston 504 is in a fluid in the damper chamber 124, according to some examples. Typically the fluid is an oil, though other fluids may be used. When the shock 118 is compressed, the fluid flows through the adjustable diameter orifices 506 and the primary piston 504 travels further inside the main body 144. When the compressive force on the shock 118 is released, the fluid is pushed back through the adjustable diameter orifices 506 and the primary piston 504 is pushed outside the main body. The same effect occurs with the piggyback piston 510, which provide additional damping.

According to some examples, the adjustable diameter orifices 506 are electronically actuated, for example, by the control signal generation system 416. For example, to slow the flow of fluid through the adjustable diameter orifices 506, the control signal generation system 416 sends one or more signals to cause the adjustable diameter orifices 506 to decrease in diameter. In some other examples, to increase the flow of fluid through the adjustable diameter orifices 506, the control signal generation system 416 sends one or more signals to cause the adjustable diameter orifices 506 to increase in diameter.

The adjustable diameter orifices 506 comprise examples of the electromechanical controls 418. According to some examples, the control signal generation system 416 generates signals to electronically actuate the adjustable diameter orifices 506. In some examples, the adjustable diameter orifices 506 include two subsets of adjustable diameter orifices: one or more compression orifices (e.g., compression orifice 322) and one or more rebound orifices (e.g, rebound orifice 324). According to some examples, the compression orifices and the rebound orifices are configured to be electronically actuated independently from one another.

According to some examples, in response to a compressive force that results in disadvantageous movement of the suspension (e.g., from a rider pedaling faster, for example, up a hill), the suspension control system 208 causes destructive interference. For example, the control signal generation system 416 sends one or more signals to the adjustable diameter orifices 506 to cause at least the compression orifices to decrease in diameter.

According to some examples, in response to a decompressive force that results in disadvantageous movement of the suspension (e.g., rider pedaling slower, for example, down a hill), the suspension control system 208 causes destructive interference. For example, the control signal generation system 416 sends one or more signals to the adjustable diameter orifices 506 to cause at least the rebound orifices to decrease in diameter.

According to some examples, in response to a compressive force that results in advantageous movement of the suspension (e.g., an obstacle), the suspension control system 208 causes constructive interference. For example, the control signal generation system 416 sends one or more signals to the adjustable diameter orifices 506 to cause at least the compression orifices to increase in diameter.

According to some examples, in response to a decompressive force that results in advantageous movement of the suspension (e.g., the mountain bike catching air from an obstacle), the suspension control system 208 causes constructive interference. For example, the control signal generation system 416 sends one or more signals to the adjustable diameter orifices 506 to cause at least the rebound orifices to increase in diameter.

While the primary piston 504 is described herein in relation to the shock 118, it should be appreciated that the fork 116 can include the primary piston 504 as described herein with their associated functionalities and adjustable diameter orifices 506, according to some examples.

FIG. 5B illustrates part of an example cross-sectional interior of the shock 118, in accordance with some examples. Inside the piggyback reservoir 152 in FIG. 5B is a piggyback chamber 508 with a piggyback piston 514. According to some examples, the primary piston 504 and the piggyback piston 514 each respectively comprise an example of the piston 320 of FIG. 3D. In the example illustrated in FIG. 5B, the piggyback piston 514 is an electronically actuated piston.

The piggyback piston 514 is electronically actuated, for example, by control signals generated by the control signal generation system 416. The piggyback piston 514 can comprise an example of the electromechanical controls 418. For example, to create destructive interference, the control signal generation system 416 generates control signals to resist movement of the piggyback piston 514. In another example, to create constructive interference, the control signal generation system 416 generates control signals to facilitate movement of the piggyback piston 514.

Figure 6:
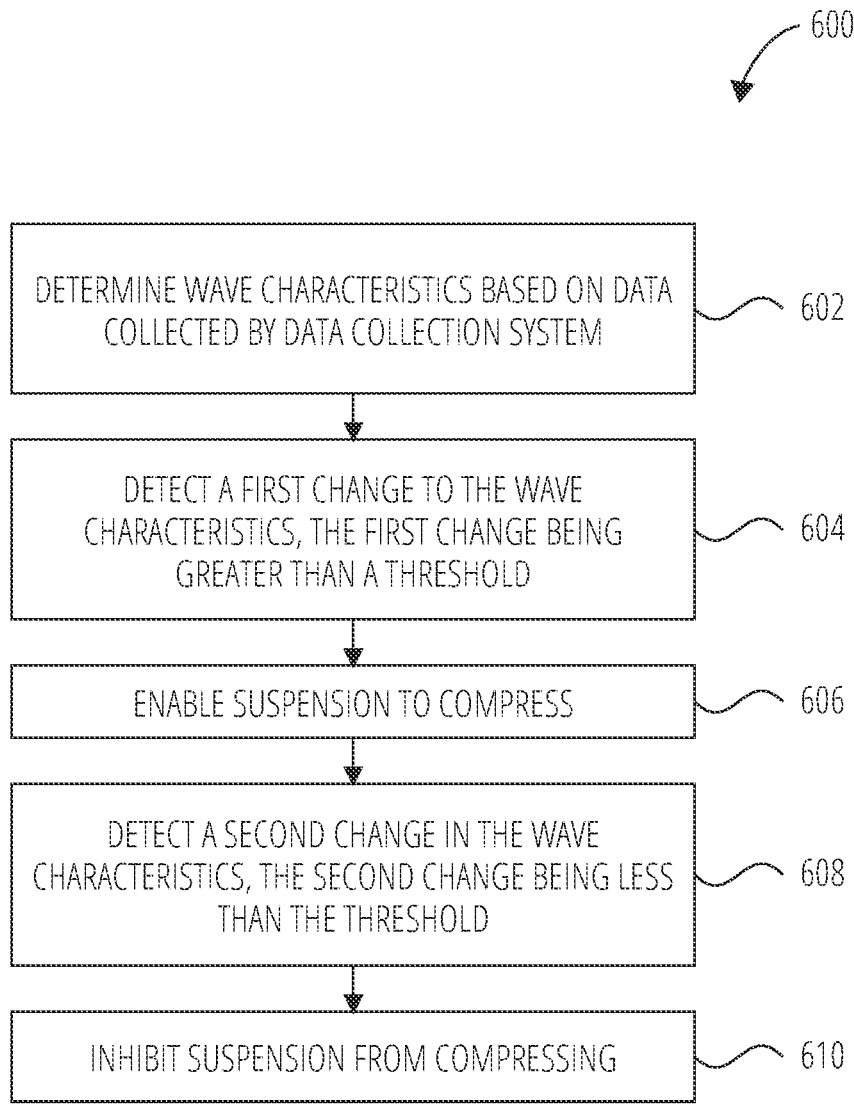
FIG. 6 is a flowchart for a method of controlling a suspension, in accordance with some examples.

FIG. 6 is a flowchart for a method 600 of controlling a suspension of a bike, in accordance with some examples. The method 600 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 600 is performed by functional components of the system 200. While the operations below are described as being performed by a processing device, it shall be appreciated that the operations of the method 600 may not necessarily be performed by the same processing device. Accordingly, any one or more of the operations of the method 600 can be performed by any one or more of the bike system 202 (e.g., bike system 400), the user system 212, the network server system 220, any subsystem thereof, or any combination thereof. The suspension may be the shock 118 and/or the fork 116.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 602, the processing device determines a set of wave characteristics based on data collected by a data collection system. The data collection system is, for example, the data collection system 204. The data collected includes data from various sensors and apparatuses (e.g., sensors and apparatuses 402) about the forces and strains imparted on various parts of the bike (e.g., mountain bike 100). The wave characteristics, such as amplitude and frequency, represent a suspension oscillation wave according to some examples. An example set of wave characteristics is wave characteristics 410.

At block 604, the processing device detects a first change to the set of wave characteristics, the first change being greater than a threshold. The threshold indicates the bike has likely struck an obstacle. The processing device detects the first change based on a change in the data being collected. The first change can include changes to one or more wave characteristics in the set of wave characteristics. The first change is, for example, comprised in a delta 414 determined by the data processing system 206 (e.g., the delta system 412) at a first point in time.

At block 606, the processing device enables the suspension to compress. According to some examples, enabling refers to facilitating compression of the suspension. The processing device enables the suspension to compress by sending a set of one or more control signals to control (e.g., alter) one or more settings of the suspension to create constructive interference. According to some examples, the control signals are generated by the control signal generation system 416 and are executed by the electromechanical controls 418 to alter one or more settings of the respective electromechanical controls 418.

At block 608, the processing device detects a second change in the set of wave characteristics, the second change being less than the threshold. That is, the bike likely has not struck an obstacle and the second change is likely due to a change in the rider's pedaling forces. The processing device detects the second change based on a change in the data being collected. The second change is, for example, comprised in a delta 414 determined by the data processing system 206 (e.g., the delta system 412) at a second point in time, where the first point in time and the second point in time occur at different points in time.

At block 610, the processing device inhibits the suspension from compressing. The processing device causes a destructive interference in the suspension to inhibit compression, either partially inhibiting compression or completely inhibiting compression. According to some examples, the control signals are generated by the control signal generation system 416 and are executed by the electromechanical controls 418. By sending a set of one or more control signals to alter the settings of the suspension to create destructive interference, the processing device is able to conserve more of the rider's energy. That is, less energy is absorbed by the suspension under destructive interference, enabling more energy to be translated into forward speed.

Figure 7:
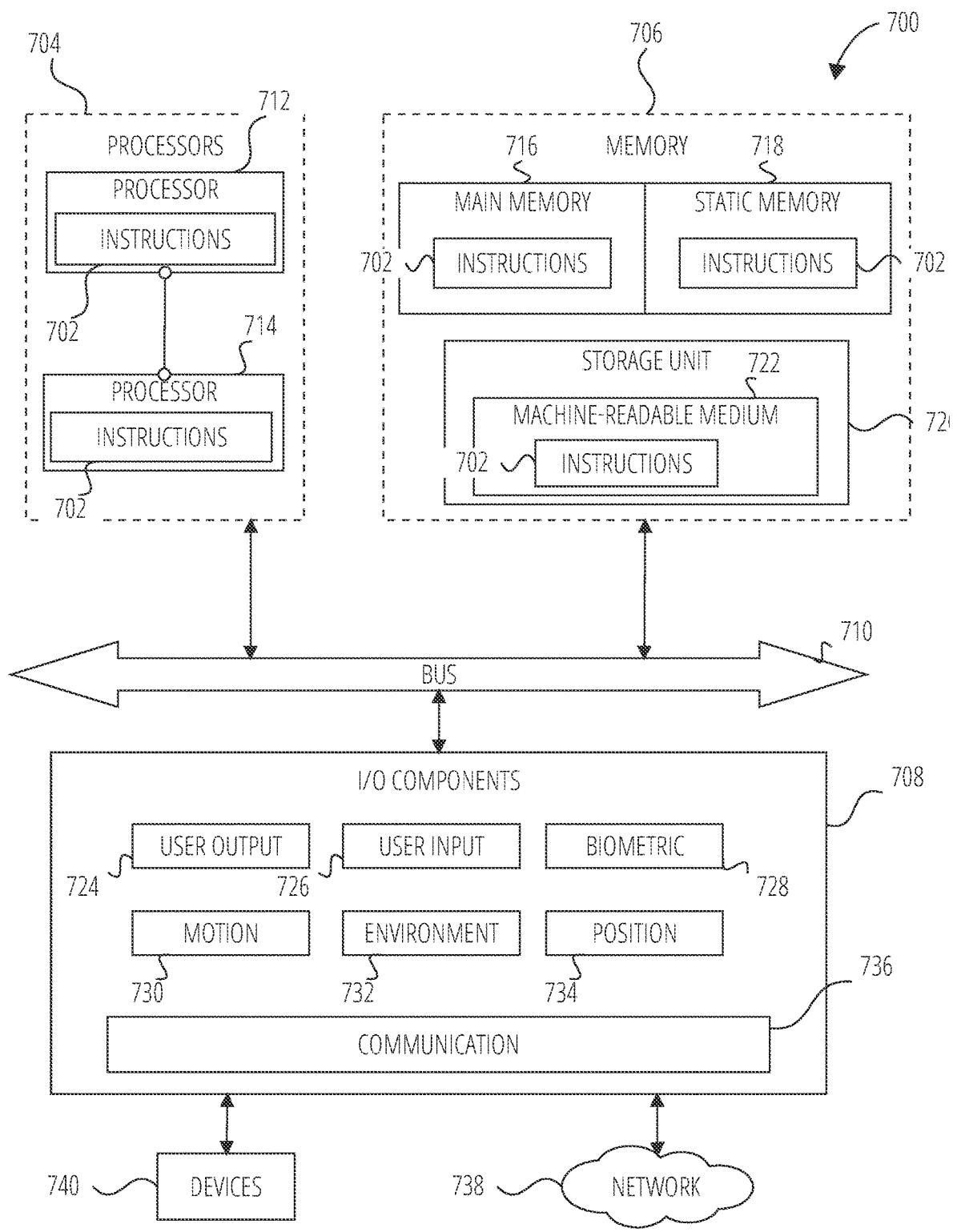
FIG. 7 illustrates a diagrammatic representation of a machine within which a set of instructions may be executed for causing the machine to perform any one or more of the methodologies discussed herein, in accordance with some examples.

FIG. 7 is a diagrammatic representation of the machine 700 within which instructions 702 (e.g., software, a program, an application, an applet, an app, or other executable code) for causing the machine 700 to perform any one or more of the methodologies discussed herein may be executed. For example, the instructions 702 may cause the machine 700 to execute any one or more of the methods described herein. The instructions 702 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 702, sequentially or otherwise, that specify actions to be taken by the machine 700. Further, while a single machine 700 is illustrated, the term "machine" shall also be taken to include a collection of machines that individually or jointly execute the instructions 702 to perform any one or more of the methodologies discussed herein. The machine 700, for example, may comprise the user system 212, the bike system 202, or any one of multiple server devices forming part of the network server system 220. In some examples, the machine 700 may also comprise both client and server systems, with certain operations of a particular method or algorithm being performed on the server-side and with certain operations of the particular method or algorithm being performed on the client-side.

The machine 700 may include processors 704, memory 706, and input/output I/O components 708, which may be configured to communicate with each other via a bus 710. In an example, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 712 and a processor 712 that execute the instructions 702. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single-core, a single processor with multiple cores (e.g., a multi-core processor), multiple processors with a single core, multiple processors with multiples cores, or any combination thereof.

The memory 706 includes a main memory 716, a static memory 718, and a storage unit 720, both accessible to the processors 704 via the bus 710. The main memory 716, the static main memory 716, and storage unit 720 store the instructions 702 embodying any one or more of the methodologies or functions described herein. The instructions 702 may also reside, completely or partially, within the main memory 716, within the static memory 718, within machine-readable medium 722 within the storage unit 720, within at least one of the processors 704 (e.g., within the processor's cache memory), or any suitable combination thereof, during execution thereof by the machine 700.

The I/O components 708 may include a wide variety of components to receive input, provide output, produce output, transmit information, exchange information, capture measurements, and so on. The specific U/O components 708 that are included in a particular machine will depend on the type of machine. For example, portable machines such as mobile phones may include a touch input device or other such input mechanisms, while a headless server machine will likely not include such a touch input device. It will be appreciated that the I/O components 708 may include many other components that are not shown in FIG. 7. In various examples, the I/O components 708 may include user output components 724 and user input components 726. The user output components 724 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 708 may include biometric components 728, motion components 730, environmental components 732, or position components 734, among a wide array of other components. For example, the biometric components 728 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 730 include acceleration sensor components (e.g., accelerometer), gravitation sensor components, rotation sensor components (e.g., gyroscope).

The environmental components 732 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 212 may have a camera system comprising, for example, front cameras on a front surface of the user system 212 and rear cameras on a rear surface of the user system 212. Further, the camera system of the user system 212 may include dual rear cameras (e.g., a primary camera as well as a depth-sensing camera), or even triple, quad or penta rear camera configurations on the front and rear sides of the user system 212. These multiple cameras systems may include a wide camera, an ultra-wide camera, a telephoto camera, a macro camera, and a depth sensor, for example.

The position components 734 include location sensor components (e.g., a GPS receiver components), altitude sensor components (e.g., altimeters or barometers that detect air pressure from which altitude may be derived), orientation sensor components (e.g., magnetometers), and the like.

Communication may be implemented using a wide variety of technologies. The I/O components 708 further include communication components 736 operable to couple the machine 700 to a network 738 or devices 740 via respective coupling or connections. For example, the communication components 736 may include a network interface component or another suitable device to interface with the network 738. In further examples, the communication components 736 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 740 may be another machine or any of a wide variety of peripheral devices (e.g., a peripheral device coupled via a USB).

Moreover, the communication components 736 may detect identifiers or include components operable to detect identifiers. For example, the communication components 736 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 736, such as location via Internet Protocol (IP) geolocation, location via Wi-Fi® signal triangulation, location via detecting an NFC beacon signal that may indicate a particular location, and so forth.

The various memories (e.g., main memory 716, static memory 718, and memory of the processors 704) and storage unit 720 may store one or more sets of instructions and data structures (e.g., software) embodying or used by any one or more of the methodologies or functions described herein. These instructions (e.g., the instructions 702), when executed by processors 704, cause various operations to implement the disclosed examples.

The instructions 702 may be transmitted or received over the network 738, using a transmission medium, via a network interface device (e.g., a network interface components included in the communication components 736) and using any one of several well-known transfer protocols (e.g., hypertext transfer protocol (HTTP)). Similarly, the instructions 702 may be transmitted or received using a transmission medium via a coupling (e.g., a peer-to-peer coupling) to the devices 740.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

What is claimed is:

1. A system for providing suspension for a mountain bike, the system comprising:
    a shock integrated with the mountain bike;
    a data collection system, the data collection system configured to collect data, the data collection system comprising:
        a displacement measurement apparatus integrated with the shock of the mountain bike, the displacement measurement apparatus configured to collect shock displacement data;
    a processor; and
    a non-transitory computer readable medium having instructions stored thereon, the instructions when executed by the processor cause the system to perform operations comprising:
        determine a set of wave characteristics based on the data collected by the data collection system;
        detect a first change in the set of wave characteristics, the first change being greater than a threshold indicating an obstacle;
        responsive to determining the first change is greater than the threshold indicating an obstacle, enable the shock to compress;
        detect a second change in the set of wave characteristics, the second change being less than the threshold indicating an obstacle; and
        responsive to determining the second change is less than the threshold indicating an obstacle, cause a destructive interference in the shock to inhibit compression of the shock.

2. The system of claim 1, wherein the shock comprises:
    a first piston housed in a first chamber, the first piston having a set of orifices, wherein each orifice in the set of orifices having an adjustable diameter.

3. The system of claim 2, wherein the destructive interference in the shock is caused by decreasing a diameter of at least one orifice of the set of orifices in the first piston.

4. The system of claim 2, wherein the data collection system further comprises:
    a shim sensor, the shim sensor positioned on a shim on the first piston, the shim sensor configured to collect shim strain data.

5. The system of claim 2, wherein the shock comprises:
a secondary piston housed in a second chamber, the secondary piston is configured to be electronically actuated by the processor.

6. The system of claim 5, wherein the destructive interference in the shock is caused by inhibiting movement of the secondary piston.

7. The system of claim 1, wherein the data collection system further comprises:
a chain sensor positioned on a chain of the mountain bike, the chain sensor configured to collect chain strain data.

8. The system of claim 1, wherein the data collection system further comprises:
a pedal sensor positioned on a pedal axle of the mountain bike, the pedal sensor configured to collect pedal strain data.

9. The system of claim 1, wherein the data collection system further comprises:
a crank position apparatus positioned on a crank of the mountain bike, the crank position apparatus configured to collect crank data, the crank data including crank position data and crank speed data.

10. The system of claim 9, wherein the crank position apparatus comprises:
a crank emitter, positioned on the crank, configured to emit a signal; and
a set of crank sensors, each crank sensor in the set of crank sensors being positioned at a different location on a frame of the mountain bike, the set of crank sensors configured to sense the signal emitted by the crank emitter.

11. The system of claim 1, wherein the data collection system further comprises:
a handlebar sensor on a handlebar of the mountain bike, positioned near a joint of the handlebars with a steering tube of the mountain bike, the handlebar sensor configured to collect handlebar strain data.

12. The system of claim 1, wherein the data collection system further comprises:
a set of frame sensors on a frame of the mountain bike, the set of frame sensors configured to collect frame strain data.

13. A method of providing suspension for a mountain bike, the method comprising:
collecting data by a data collection system;
determine a set of wave characteristics based on the data collected by the data collection system;
detect a first change in the set of wave characteristics, the first change being greater than a threshold indicating an obstacle;
responsive to determining the first change is greater than the threshold indicating an obstacle, enable a shock of the mountain bike to compress;
detect a second change in the set of wave characteristics, the second change being less than the threshold indicating an obstacle; and
responsive to determining the the second change is less than the threshold indicating an obstacle, cause a destructive interference in the shock of the mountain bike to inhibit compression of the shock.

14. The method of claim 13, wherein the data collection system comprises:
a displacement measurement apparatus integrated with the shock of the mountain bike, the displacement measurement apparatus configured to collect shock displacement data.

15. The method of claim 13, wherein the shock comprises:
a first piston housed in a first chamber, the first piston having a set of orifices, wherein each orifice in the set of orifices having an adjustable diameter.

16. The method of claim 15, wherein the destructive interference in the shock is caused by decreasing a diameter of at least one orifice of the set of orifices in the first piston.

17. The method of claim 15, wherein the data collection system comprises:
a shim sensor, the shim sensor positioned on a shim on the first piston, the shim sensor configured to collect shim strain data.

18. The method of claim 15, wherein the shock comprises:
a secondary piston housed in a second chamber, the secondary piston is configured to be electronically actuated by the processor.

19. The method of claim 18, wherein the destructive interference in the shock is caused by inhibiting movement of the secondary piston.

20. A non-transitory computer-readable storage medium, the computer-readable storage medium including instructions that when executed by a computer, cause the computer to:
collect data by a data collection system;
determine a set of wave characteristics based on the data collected by the data collection system;
detect a first change in the set of wave characteristics, the first change being greater than a threshold indicate an obstacle;
responsive to determining the first change is greater than the threshold indicating an obstacle, enable a shock of the mountain bike to compress;
detect a second change in the set of wave characteristics, the second change being less than the threshold indicate an obstacle; and
responsive to determining the the second change is less than the threshold indicating an obstacle, cause a destructive interference in the shock of the mountain bike to inhibit compression of the shock.

* * * * *